(12) United States Patent
Oda et al.

(10) Patent No.: US 8,203,683 B2
(45) Date of Patent: Jun. 19, 2012

(54) ELECTRO-OPTIC DEVICE HAVING TERMINAL SECTION AND PIXEL SECTION WITH PARTICULAR MULTILAYER STRUCTURES

(75) Inventors: Nobuhiko Oda, Hashima (JP); Satoshi Ishida, Ogaki (JP); Masaaki Aota, Ogaki (JP); Tomoyasu Hirata, Mizuho (JP); Kazuyoshi Sakai, Azumino (JP); Kosuke Takasu, Tottori (JP)

(73) Assignee: Sony Corporation, Tokyo (JP)

( * ) Notice: Subject to any disclaimer, the term of this patent is extended or adjusted under 35 U.S.C. 154(b) by 1119 days.

(21) Appl. No.: 12/057,365

(22) Filed: Mar. 27, 2008

(65) Prior Publication Data
US 2009/0002623 A1 Jan. 1, 2009

(30) Foreign Application Priority Data

Mar. 27, 2007 (JP) ................................. 2007-082768
Mar. 27, 2007 (JP) ................................. 2007-082769
Jun. 8, 2007 (JP) ................................. 2007-153348
Jun. 8, 2007 (JP) ................................. 2007-153349

(51) Int. Cl.
*G02F 1/1345* (2006.01)
*G02F 1/1343* (2006.01)
*H01L 29/04* (2006.01)

(52) U.S. Cl. ........ 349/152; 349/147; 349/149; 349/151; 257/59

(58) Field of Classification Search ................... 349/147, 349/149, 151, 152; 257/59
See application file for complete search history.

(56) References Cited

U.S. PATENT DOCUMENTS 6,297,519 B1 * 10/2001 Fujikawa et al. ................ 257/59
2003/0063249 A1 * 4/2003 Hoshino et al. ................ 349/149

FOREIGN PATENT DOCUMENTS

| CN | 1854834 | 11/2006 |
|---|---|---|
| JP | 07-263700 | 10/1995 |
| JP | 11-142868 | 5/1999 |
| JP | 2002-139744 | 5/2002 |
| JP | 2002-229065 | 8/2002 |
| JP | 2005-300750 | 10/2005 |
| JP | 2006-106516 | 4/2006 |
| JP | 2006-309028 A | 11/2006 |
| JP | 2006-313231 | 11/2006 |

* cited by examiner

*Primary Examiner* — Michael Caley
(74) *Attorney, Agent, or Firm* — K&L Gates LLP

(57) ABSTRACT

An electro-optic device includes a pixel section and a terminal section through which a semiconductor circuit or a wiring board is mounted around the pixel section. The terminal section has a multilayer structure including a terminal connection wire including an uppermost layer containing titanium, a terminal interlayer made of an electroconductive material capable of being wet-etched, and a terminal transparent electroconductive film in that order from below.

18 Claims, 25 Drawing Sheets

ELECTRO-OPTIC DEVICE HAVING TERMINAL SECTION AND PIXEL SECTION WITH PARTICULAR MULTILAYER STRUCTURES

BACKGROUND

1. Technical Field

The present invention relates to electro-optic devices, and particularly to an electro-optic device including a pixel section disposed in the middle region and a terminal section through which another semiconductor circuit or another wiring board is mounted in the outer region of the electro-optic device.

2. Related Art

In electro-optic devices such as liquid crystal display devices, a pixel section displaying images is disposed in the middle region, and a circuit for driving the pixel section is disposed in the pixel section. If the driving circuit is large or operates at a high speed, and accordingly requires the use of another semiconductor circuit or a semiconductor circuit mounted on another wiring board, a terminal section is provided in the outer region of the electro-optic device and the additional semiconductor circuit or wiring board is mounted through the terminal section.

When the pixel section is disposed in the middle region and the terminal section is provided in the outer region, it is preferable that the formations of the pixel section and the terminal section are performed in one step.

For example, JP-A-2006-309028 discloses a method for forming a terminal section suitable for the COG (Chip On Glass) technique in display devices or the like. In this disclosure, the molybdenum gate electrodes of the pixel section and the molybdenum wires of the terminal section are formed in the same step, and data lines of the pixel section and connection wires of the terminal section are formed in the same step. After a protective film and a planarizing film are formed over the entire surface, the planarizing layer is removed from the regions overlying the data lines of the pixel section and the regions in the terminal section outside the ends of the data lines in the same step. Also, a relatively wide area of the protective film is removed from the terminal section in the same step as the contact holes are formed in the protective film in the pixel section. In the pixel section, a transparent electroconductive film connected to the contact holes is formed over the planarizing layer to form pixel electrodes. In the terminal section, the transparent electroconductive film is formed over the connection wires, and the COG technique is applied to the transparent electroconductive film. The data line and the connection wire have a multilayer structure of molybdenum/aluminum/molybdenum or titanium/aluminum/titanium. The protective film is made of $Si_xN_y$ (silicon nitride). The planarizing layer is made of an acrylic resin. The transparent electroconductive film is made of ITO (indium tin oxide) or IZO (indium zinc oxide). The terminal section also uses ITO or IZO. This is because ITO and IZO can prevent the terminal section from corroding and an oxide coating from being formed over the surface of the terminal section, in the manufacturing process of the display device from the step of forming the terminal section to the step of COG mounting, and because the use of ITO or IZO allows the COG mounting technique to establish good electric connection and ensures the reliability of the product after COG mounting.

In JP-A-2006-309028, the molybdenum wires, the molybdenum/aluminum/molybdenum or titanium/aluminum/titanium multilayer structure and the transparent electroconductive film that are formed in the pixel section are also used for the terminal section.

Although in this document, the connection wires, or connection wire layer, have a molybdenum-containing structure or a titanium-containing structure, these structures each have merits and demerits. More specifically, the molybdenum-containing structure is easily formed by wet etching and the surface coating formed in the atmosphere is an oxide or a hydroxide film, which can be easily removed with water or the like. However, it is not easily formed by dry etching and is accordingly difficult to form fine. On the other hand, the titanium-containing structure can be formed by dry etching and is accordingly suitable to form a fine structure. However, it is liable to be oxidized. For example, if an ITO layer is formed on the titanium-containing structure, an oxide coating is formed in its atmosphere to increase the interface resistance.

When fine wires and a fine terminal section are formed, the $Si_xN_y$ protective film is also formed in a desired shape by dry etching using a fluorine-containing gas as in JP-A-2006-309028. In this instance, a product of reactive components including fluorine is formed over the surface of the connection wires. If the connection wires have the molybdenum-containing structure, the surface product can be removed together with the molybdenum hydroxide coating by cleaning with water or the like. If the connection wires have the titanium-containing structure, however, the surface product cannot be removed only by simply cleaning with water.

In order to form fine wires and a fine terminal section, the connection wire preferably has a titanium-containing structure. However, the interface resistance between the connection wire of the terminal section and the ITO layer is disadvantageously increased and the surface product is difficult to remove, as described above.

SUMMARY

An advantage of some aspect of the invention is that it provides an electro-optic device in which the interface resistance has been prevented from being increased associated with the formation of a transparent electroconductive film, and a method for manufacturing the electro-optic device. Another advantage is to provide an electro-optic device in which a surface product formed on the surfaces of the connection wires by dry etching using fluorine-containing gas has been easily removed and in which the interface resistance has been prevented from being increased and a method for manufacturing the electro-optic device. The following aspects each have at least one of those advantages.

According to an aspect of the invention, an electro-optic device is provided which includes a pixel section in the middle region and a terminal section around the pixel section through which a semiconductor circuit or a wiring board is mounted. The terminal section has a multilayer structure including a terminal connection wire including an uppermost layer containing titanium, a terminal interlayer made of an electroconductive material capable of being wet-etched, and a terminal transparent electroconductive film in that order from below.

The multilayer structure in the terminal section of the electro-optic device has the interlayer between the transparent electroconductive film and the titanium-containing layer. The presence of the interlayer can prevent the formation of an oxide coating and thus reduce the interface resistance, in comparison with the case in which the transparent electroconductive film is disposed directly on the titanium-containing layer.

If a $Si_xN_y$ protective film is formed after the formation of the interlayer, a product is produced on the surface of the interlayer by dry etching using a fluorine-based etching gas. Such a surface product can be easily removed by wet etching of the surface of the interlayer, or cleaning with water.

Preferably, the pixel section have a multilayer structure including a pixel connection wire formed in the same process as the terminal connection wire is formed, a pixel interlayer formed in the same process as the terminal interlayer is formed, and a pixel transparent electroconductive film formed in the same process as the terminal transparent electroconductive film is formed, in that order from below.

Since the multilayer structure of the pixel section can be formed in the same process as the multilayer of the terminal section is formed, a common process can be applied to form these two sections, and the multilayer structures of the terminal section and the pixel section can be formed at one time without additional steps.

According to another aspect of the invention, an electro-optic device is provided which includes a pixel section in the middle region and a terminal section around the pixel section through which a semiconductor circuit or a wiring board is mounted. The terminal section has a multilayer structure including a terminal connection wire including an uppermost layer containing titanium, a terminal protective insulating layer having an opening through which the terminal connection wire is exposed, and a terminal interlayer covering the terminal connection wire exposed through the opening, the terminal interlayer being made of an electroconductive material capable of being wet-etched, and a terminal transparent electroconductive film, in that order from below.

In this structure as well as the known structure, the protective insulating layer is formed on the connection wire including the titanium-containing uppermost layer. However, in the multilayer structure in the terminal section of this embodiment, an interlayer is disposed between the transparent electroconductive film and the titanium-containing layer. The presence of the interlayer can prevent the formation of an oxide coating and thus reduce the interface resistance, in comparison with the case in which the transparent electroconductive film is directly formed on the titanium-containing layer.

For example, the interlayer may be formed subsequent to the formation of the connection wire including the titanium-containing uppermost layer before forming the protective insulating layer. In this instance, those layers should be formed continuously and a continuous film-forming apparatus may be required. In such a process, the connection wire including the titanium-containing uppermost layer and the protective insulating layer may be formed with a conventional apparatus, and then, the interlayer may be formed in the region of the terminal section where the interface resistance should be reduced before forming the transparent electroconductive film. Thus, the interface resistance in the terminal section can be reduced without use of an expensive continuous film-forming apparatus. The terminal section generally has a plurality of terminals, and all the terminals may have the interlayer, or only specific terminals whose interface resistance should be reduced may have the interlayer.

In this structure, the pixel section preferably has a multilayer structure including, in this order from below, a pixel connection wire formed in the same process as the terminal connection wire is formed, a pixel protective insulating layer having an opening through which the pixel connection wire is exposed, the pixel protective insulating layer being formed in the same process as the terminal protective insulating layer is formed, and a pixel transparent electroconductive film covering the pixel connection wire exposed through the opening. The pixel transparent electroconductive film is formed of the same process as the terminal transparent electroconductive film is formed. The terminal interlayer, if extending to the pixel section, is removed from the pixel section.

In this structure, the terminal section has the interlayer while the pixel section has no interlayer. Thus, the interface resistance in the terminal section can be reduced with the pixel section having the known structure.

Preferably, the interlayer is made of molybdenum. Molybdenum is generally used in electro-optic devices and is an electroconductive material capable of being wet-etched. The surface of the molybdenum film can be cleaned by washing with water. Thus, the interface resistance can be reduced in use of a generally used material.

Alternatively, the interlayer may be made of IZO or ITO. IZO and ITO are generally used in electro-optic devices and are electroconductive materials capable of being wet-etched. By wet-etching the surface of the interlayer, undesired deposition on the surface of the interlayer can easily be removed. Thus, the interface resistance can be reduced in use of a generally used material.

According to still another aspect of the invention, an electro-optic device is provided which includes a pixel section in the middle region and a terminal section around the pixel section through which a semiconductor circuit or a wiring board is mounted. The pixel section has a multilayer structure including a pixel connection wire including an uppermost layer containing titanium, a pixel interlayer made of an electroconductive material capable of being wet-etched, and a pixel transparent electroconductive film, in that order from below.

In this structure, the multilayer structure of the pixel section has the pixel interlayer made of an electroconductive material capable of being wet-etched between the transparent electroconductive film and the titanium-containing layer. Thus, the formation of an oxide coating can be prevented, and consequently the interface resistance can be reduced, in comparison with the case in which the transparent electroconductive film is directly formed on the titanium-containing layer.

Preferably, the pixel section further includes a pixel protective insulating layer between the pixel interlayer and the pixel transparent electroconductive film. In this structure, the terminal section preferably has a multilayer structure including a terminal connection wire formed in the same process as the pixel connection wire is formed, a terminal interlayer formed in the same process as the pixel interlayer is formed, a terminal protective insulating layer formed in the same process as the pixel protective insulating layer is formed, and a terminal transparent electroconductive film formed in the same process as the pixel transparent electroconductive film is formed, in that order from below. The terminal protective insulating layer and the terminal interlayer have an opening and the terminal transparent electroconductive film fills the opening.

For forming the multilayer structure of the terminal section, the opening is formed across the terminal protective insulating layer and the terminal interlayer with the terminal interlayer disposed between the terminal protective insulating layer and the titanium-containing layer, and then the terminal transparent electroconductive film is formed to fill the opening. When the opening is formed, the portion of the terminal interlayer through which the opening is formed is removed. Hence, products formed on the surface of the interlayer during the formation of the opening in the protective insulating layer by dry etching using a fluorine-based etching gas is removed to together with the interlayer. Thus, the surface product produced during the dry etching using a fluorine-based gas can be easily removed in the terminal section, which requires low interface resistance. Consequently, the interface resistance in the terminal section can be reduced.

In such a structure, the interlayer is preferably made of molybdenum. Molybdenum is generally used in electro-optic devices and is an electroconductive material capable of being wet-etched. Thus, the interface resistance can be reduced in use of a generally used material.

Alternatively, the interlayer may be made of IZO or ITO. IZO and ITO are generally used in electro-optic devices and are electroconductive materials capable of being wet-etched. Thus, the interface resistance can be reduced in use of a generally used material.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will now be described with reference to the drawings. While the following description illustrates liquid crystal display devices as embodiments of the electro-optic device of the invention, the invention can be applied to various types of electro-optic devices other than the liquid crystal display device. Electro-optic devices include electroluminescent devices, plasma display devices, electrophoretic display devices, and devices using electron emission elements.

Although the liquid crystal display device described below has a terminal section through which another semiconductor circuit chip is mounted by the COG (chip on glass) technique or through which another wiring board such as FPC (flexible printed circuit board) is mounted by the OLB (outer lead bonding) technique, the electro-optic device of the invention may have a structure in which a scanning line driving circuit, a signal line driving circuit, or the like is mounted on the glass substrate of the device by the low-temperature polysilicon technique.

Transmissive full color matrix liquid crystal display devices will be described below as embodiments of the invention in which parts of the pixel section and terminal section can be formed through common steps. Other parts can be modified according to the specifications of the desired electro-optic device as long as the multilayer structure of the terminal section is formed of the same materials as the gate electrodes, data lines and pixel electrodes of the pixel section.

First Embodiment

Figure 1:
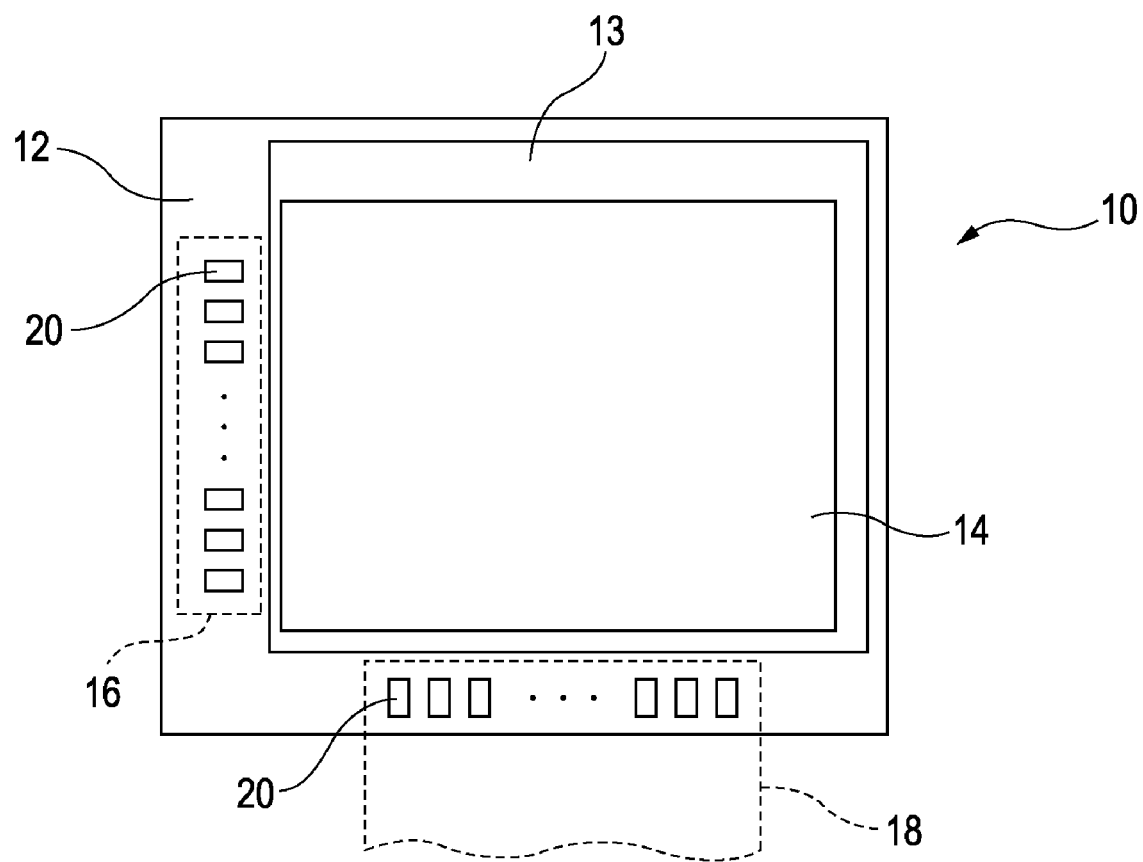
FIG. 1 is a plan view of a liquid crystal display device according to a first embodiment of the invention.

FIG. 1 shows the structure of a liquid crystal display device 10 according to a first embodiment. The liquid crystal display device 10 is of a transmissive full color matrix type including a lower substrate 12 and an upper substrate 13 with a liquid crystal molecule layer in between, and has a pixel section 14 and terminal sections 20 each including a plurality of terminals around the pixel section 14. FIG. 1 also shows a semiconductor circuit chip 16 and a FPC (wiring board) 18 that are connected to the terminal sections 20 by the COG technique and the OLB technique, respectively, and thus mounted on the lower substrate 12.

Figure 2:
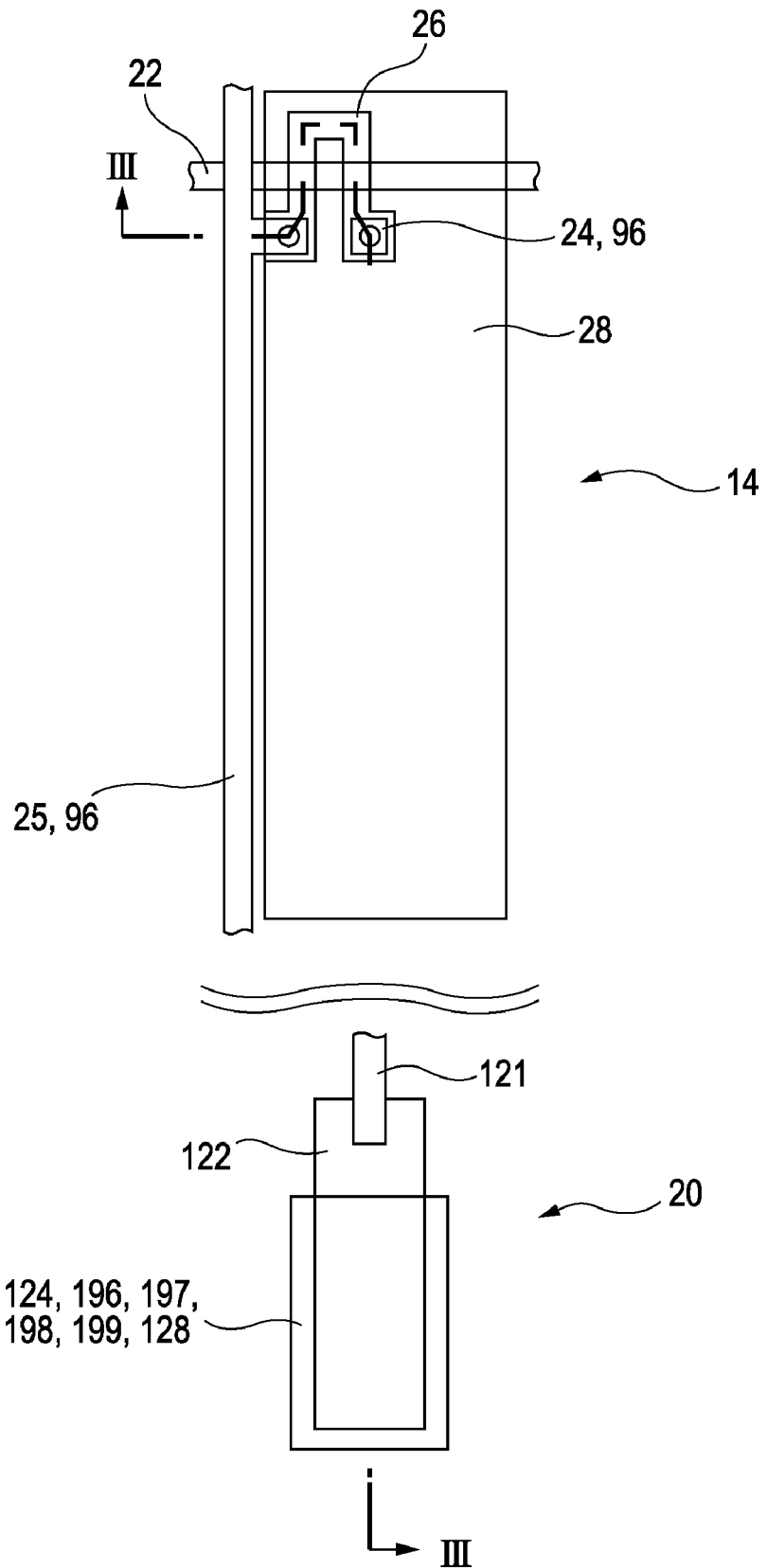
FIG. 2 is a representation of a pixel section and a terminal section in the first embodiment of the invention.

FIG. 2 is a fragmentary plan view of the horizontal arrangement of the pixel section 14 and the terminal section 20, showing one of the pixels in the pixel section 14 and one of the terminals in the terminal section.

The pixels in the pixel section 14 are disposed corresponding to the intersections where gate electrodes 22 and data lines 25 perpendicularly intersect each other. Each pixel has a single switching element 26. The switching element 26 has a source terminal connected to a multilayer wire including the data line 25 and a pixel molybdenum film 96, and a drain terminal connected to a pixel electrode defined by a pixel transparent electroconductive film 28 through a multilayer wire portion including a pixel connection wire 24 and the pixel molybdenum film 96. The pixel connection wire 24 and the data line 25 are formed of the same material in the same step. The source terminal and the drain terminal of the switching element 26 are compatible. The drain terminal may be called the source terminal, and the source terminal may be called the drain terminal.

Each terminal of the terminal section 20 includes a lead-out wire 121 extracted from the pixel section 14, a lower wire 122 connected to the lead-out wire 121, a terminal connection wire 124 connected to the lower wire 122, a terminal molybdenum film 196, and a terminal transparent electroconductive film 128. The lead-out wire 121 and the terminal connection wire 124 are formed of the same material in the same step as the pixel connection wire 24 and the data line 25 of the pixel section 14, as described below. The lower wire 122 is formed of the same material in the same step as the gate electrode 22 of the pixel section 14. The terminal molybdenum film 196 is formed of the same material in the same step as the pixel molybdenum film 96. The terminal transparent electroconductive film 128 is formed of the same material in the same step as the pixel transparent electroconductive film 28.

Figure 3:
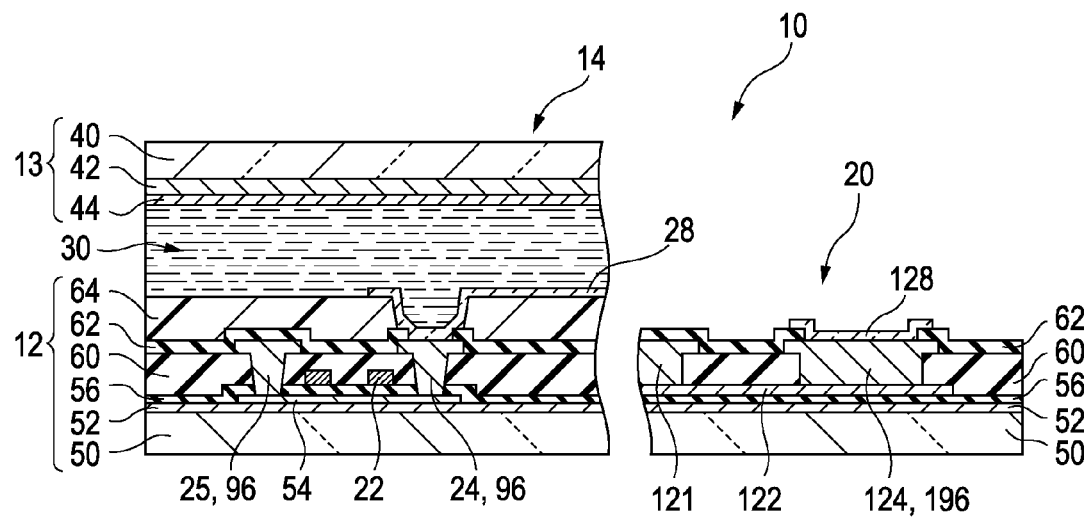
FIG. 3 is a sectional view of the liquid crystal display device according to the first embodiment of the invention.

For the description of the structure of the liquid crystal display device 10, FIG. 3 shows the sectional view taken along line III-III of FIG. 2. The left of FIG. 3 shows the sectional view of one of the pixels in the pixel section 14, and the right shows the sectional view of one of the terminals in the terminal section 20. The liquid crystal display device 10 has a structure including the lower substrate 12 and the upper substrate 13 with a liquid crystal molecule layer 30 in between, as described above, and the terminal sections 20 are disposed on the lower substrate 12 in the outer region to which the upper substrate 13 does not extend.

The structure of the pixel section 14 will first be described. In the pixel section 14, the upper substrate 13 includes color filters (CF) 42 having a black matrix (BM) on an upper glass plate 40 and an opposing electrode 44 on the color filters 42. For the liquid crystal display device 10, the upper substrate 13 is opposed to the lower substrate 12 with the opposing electrode 44 facing the liquid crystal molecule layer 30. FIG. 3 does not show the alignment layer and some other members.

The lower substrate 12 includes a buffer layer 52 on a lower glass plate 50, and a semiconductor layer 54, a gate insulating layer 56, the gate electrode 22 and an insulating interlayer 60 are formed on the buffer layer 52. Contact holes are formed in the gate insulating layer 56 and the insulating interlayer 60. The data line 25 and the pixel connection wire 24 are connected to the source and the drain of the semiconductor layer 54 respectively through the contact holes. The pixel molybdenum films 96 are formed on the data line 25 and the pixel connection wire 24. A protective insulating layer 62 and a planarizing layer 64 are further formed over the pixel molybdenum films 96. The pixel molybdenum film 96 on the pixel connection wire 24 is connected to the pixel transparent electroconductive film 28 through an opening formed in the protective insulating layer 62 and the planarizing layer 64, and the portion of the pixel transparent electroconductive film 28 overlying the planarizing layer 64 acts as the pixel electrode.

The structure of the terminal section 20 will now be described. Since a semiconductor circuit chip 16 and an FPC (wiring board) 18 are to be connected to the terminal section 20 by the COG technique and the OLB technique, as mentioned above, the upper substrate 13 does not extend over the terminal section 20. In other words, the terminal section 20 is defined only by the structure disposed on the lower glass plate 50. In the terminal section 20, the buffer layer 52 is disposed on the lower glass plate 50, and the gate insulating layer 56, the lower wire 122 and the insulating interlayer 60 are formed on the buffer layer 52. The terminal connection wire 124 is connected to the lower wire 122 through a contact hole formed in the insulating interlayer 60. The terminal connection wire 124 is covered with the terminal molybdenum film 196, and the protective insulating layer 62 is further formed on the terminal molybdenum film 196. Since the planarizing layer 64 is completely removed from the terminal section 20, the terminal section 20 shown in FIG. 3 does not have the planarizing layer 64. The terminal molybdenum film 196 on the terminal connection wire 124 is connected to the terminal transparent electroconductive film 128 through an opening formed in the protective insulating layer 62.

Figure 4:
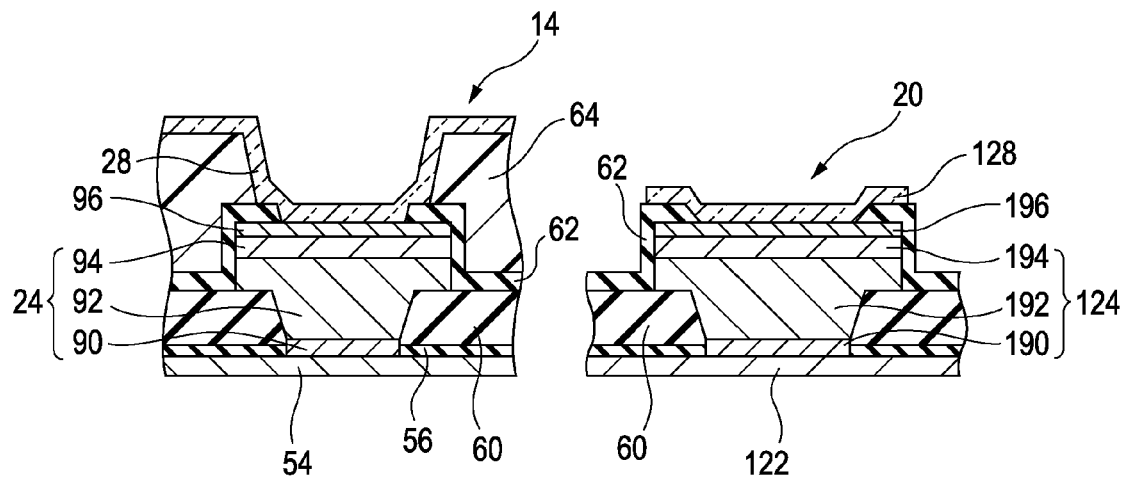
FIG. 4 is a fragmentary enlarged view of the multilayer structures of the pixel section and the terminal section of the liquid crystal display device according to the first embodiment of the invention.

FIG. 4 is a fragmentary enlarged view of the multilayer structures of the pixel connection wire 24 and around it in the pixel section 14 and of the terminal connection wire 124 and around it in the terminal section 20. The same parts as in FIGS. 1 to 3 in the following description are designated by the same reference numerals and such parts will not be described in detail. Also, the following description will be illustrated using the same reference numerals as in FIGS. 1 to 3. FIG. 4 omits the upper substrate 13, the liquid crystal molecule layer 30, and the lower glass plate 50 and buffer layer 52 of the lower substrate 12.

The left of FIG. 4 shows a fragmentary enlarged structure of the pixel connection wire 24 and the pixel molybdenum film 96 in the pixel section 14. The pixel connection wire 24 is connected to the drain of the switching element 26 formed in the semiconductor layer 54 disposed on the buffer layer 52 (not shown in FIG. 4). The pixel connection wire 24 is connected to the semiconductor layer 54 exposed through the contact hole formed in the gate insulating layer 56 and the insulating interlayer 60, and includes a titanium layer 90, an aluminum layer 92, and an uppermost titanium layer 94 formed in that order. The pixel molybdenum film 96 is formed on the uppermost titanium layer 94 of the pixel connection wire 24. In FIG. 4, the insulating interlayer 60 is directly disposed on the gate insulating layer 56. This is because the gate electrode 22 formed subsequent to the formation of the gate insulating layer 56 is removed from this region. The titanium layers 90 and 94 are not necessarily made of elementary titanium and may be made of a titanium-containing material, such as titanium nitride (TiN). In the following description, layers containing titanium are simply referred to as titanium layers.

The protective insulating layer 62 and the planarizing layer 64 are formed over the pixel molybdenum film 96, and a contact hole is formed in these insulating layers so as to expose part of the pixel molybdenum film 96. The pixel transparent electroconductive film 28 is disposed to cover the pixel molybdenum film 96 exposed through the contact hole. The pixel transparent electroconductive film 28 is thus connected to the drain of the switching element 26 to serve as the pixel electrode disposed on the planarizing layer 64, as described with reference to FIG. 2.

The right of FIG. 4 shows a fragmentary enlarged structure of the terminal connection wire 124 and the terminal molybdenum film 196 in the terminal section 20. Unlike the pixel connection wire 24, the terminal connection wire 124 is connected to the lower wire 122 disposed on the buffer layer 52 and gate insulating layer 56 (not shown in FIG. 4). The lower wire 122 is formed in the same step as the gate electrode 22 of the pixel section 14, as described below. If, for example, the gate electrode 22 is made of molybdenum, the lower wire 122 is also made of molybdenum. Since the lower wire 122 is formed in the terminal section 20 in the same step as the gate electrode 22, the gate insulating layer 56, the lower wire 122 made of the same material as the gate electrode 22, and the insulating interlayer 60 are formed in that order from below, unlike the structure of the pixel section 14 where the insulating interlayer 60 is directly disposed on the gate insulating layer 56.

The terminal connection wire 124 is connected to the lower wire 122 exposed through the contact hole formed in the insulating interlayer 60 and includes a titanium layer 190, an aluminum layer 192, and an uppermost titanium layer 194 formed in that order from below. The terminal molybdenum film 196 is disposed on the uppermost titanium layer 194 of the terminal connection wire 124.

The planarizing layer 64 is completely removed from the terminal section 20, and the protective insulating layer 62 is disposed on the terminal molybdenum film 196. The protective insulating layer 62 is provided with a contact hole so as to expose part of the terminal molybdenum film 196. The terminal transparent electroconductive film 128 is formed so as to cover the terminal molybdenum film 196 exposed through the contact hole. The transparent electroconductive film 128 of the terminal section 20 suppresses the surface oxidation of the terminal molybdenum film 196 and prevents the corrosion of the terminal section.

As described above, the pixel section 14 has the electroconductive multilayer structure including the pixel connection wire 24, the pixel molybdenum film 96, and the pixel transparent electroconductive film 28, and the terminal section 20 has the electroconductive multilayer structure including the terminal connection wire 124, the terminal molybdenum film 196, and the terminal transparent electroconductive film 128. The pixel connection wire 24 and the terminal connection wire 124 are formed in the same step. The pixel molybdenum film 96 and the terminal molybdenum film 196 are formed in the same step. The pixel transparent electroconductive film 28 and the terminal transparent electroconductive film 128 are formed in the same step. While the pixel connection wire 24 and the terminal connection wire 124 are defined by the titanium/aluminum/titanium multilayer structure in the present embodiment, they may be defined by, for example, a titanium nitride (TiN)/aluminum/titanium nitride (TiN) multilayer structure or a titanium/aluminum-silicon alloy (Al—Si) multilayer structure.

A process for forming the structure described with reference to FIGS. 1 to 4 will now be described with reference to the flow charts shown in FIGS. 5 and 6 and the drawings shown in FIGS. 7 to 12. In addition, the effect of the molybdenum film will be described with reference to FIGS. 13A to 13C and 14A to 14D. The same parts as in FIGS. 1 to 4 in the following description are designated by the same reference numerals and such parts will not be described in detail. Also, the following description will be illustrated using the same reference numerals as in FIGS. 1 to 4.

Figure 5:
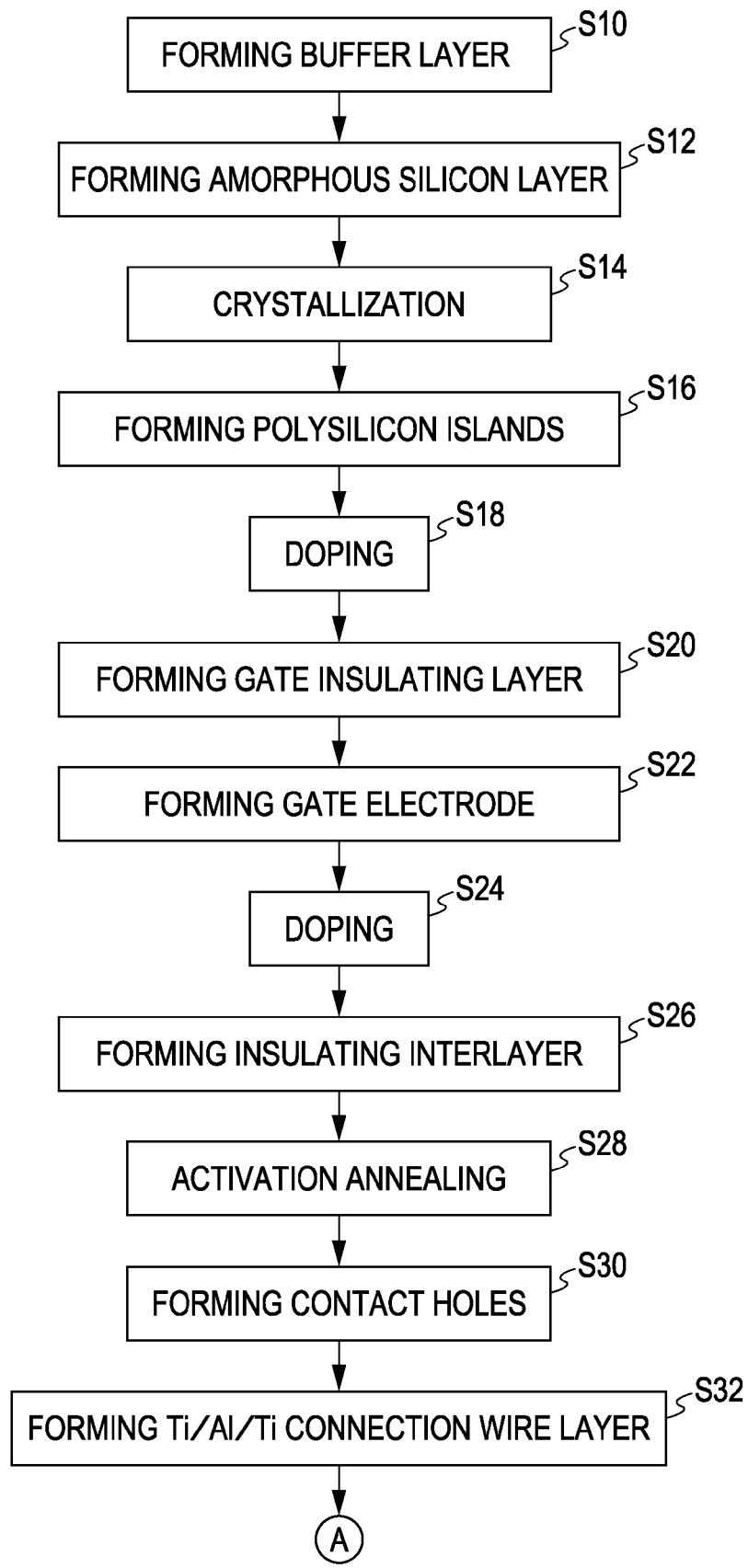
FIG. 5 is a flow chart of the first half of a procedure for preparing a lower substrate of the liquid crystal display device according to the first embodiment.
Figure 6:
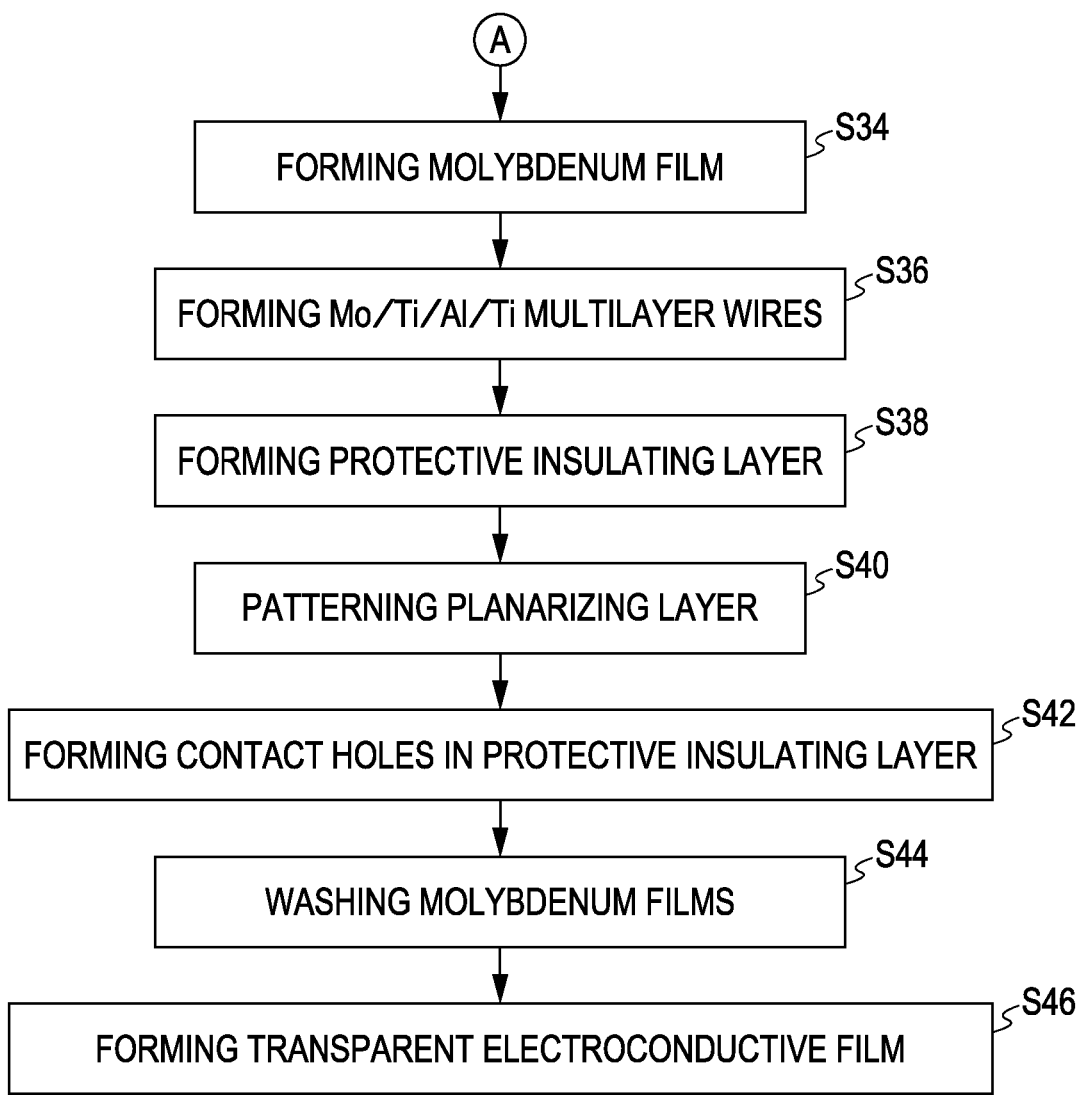
FIG. 6 is a flow chart of the latter half of the procedure for preparing the lower substrate of the liquid crystal display device according to the first embodiment.

FIG. 5 is a flow chart of a procedure up to the step of forming a connection wire layer having a titanium/aluminum/titanium multilayer structure, and FIG. 6 is a flow chart of the subsequent procedure. The lower substrate 12 is prepared through the steps shown in FIGS. 5 and 6. The liquid crystal display device 10 is produced further through a process for preparing the upper substrate 13 and a process for disposing the liquid crystal molecule layer 30 between the lower substrate 12 and the upper substrate 13.

In the process for preparing the lower substrate 12 of the liquid crystal display device 10 shown in FIGS. 1 to 4, the last step in FIG. 5 of forming the titanium/aluminum/titanium film, and the first step in FIG. 6 of forming the molybdenum film are continuously performed; hence, a titanium/aluminum/titanium/molybdenum structure is continuously formed. For the sake of comparison with the known technique, in which the molybdenum film is not used, the same steps as those performed in the known technique are shown together in FIG. 5.

Figure 7:
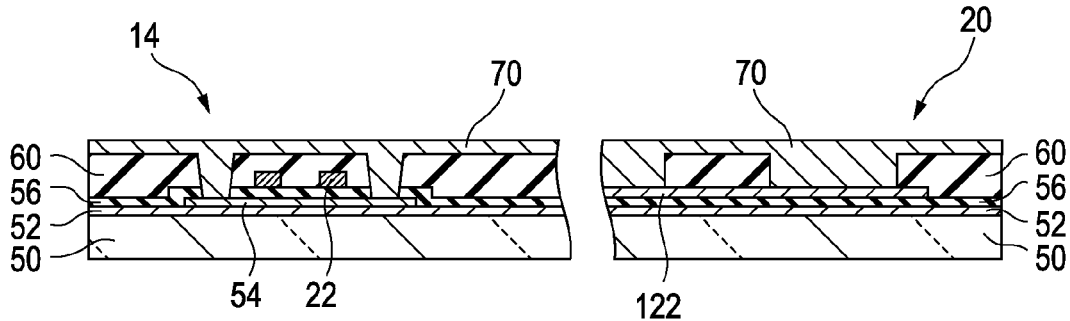
FIG. 7 is a sectional view of Step S32 of the flow chart shown in FIG. 5.

FIG. 5 shows a procedure up to the step of forming the titanium/aluminum/titanium multilayer structure on the lower glass plate 50, and FIG. 7 shows the pixel section 14 and the terminal section 20 after the completion of the step of forming the titanium/aluminum/titanium multilayer structure. The left of FIG. 7 shows the structure of the pixel section 14, and the right shows the structure of the terminal section 20. The same applies to FIGS. 8 to 12.

As shown in FIG. 5, a buffer layer 52 is formed over the entire surface of a lower glass plate 50 (S10), and an amorphous silicon (a-Si) layer is formed over the buffer layer 52 (S12). The buffer layer 52 has a $SiO_2$/SiN multilayer structure of 100 to 200 nm in thickness. The amorphous silicon layer has a thickness of about 30 to 50 nm. These layers are formed by plasma CVD. Thus, an a-Si/$SiO_2$/SiN/glass multilayer structure (glass substrate) is formed upward from the lower glass plate 50.

Then, the amorphous silicon layer is crystallized at a low temperature by laser light exposure (laser annealing) (S14), thereby forming a polysilicon layer. The resulting polysilicon layer is patterned to form polysilicon islands (semiconductor layers 54) in desired regions (S16). Then, a resist pattern is formed by photolithography. If the switching element 26 is an n channel TFT, the source and drain regions of the TFT are doped with, for example, phosphorus (S18).

Then, a $SiO_2$ single-layer or $Si_xN_y/SiO_2$ multilayer gate insulating layer 56 is formed over the entire surface of the substrate including the semiconductor layers 54 (S20).

Thus, the gate insulating layer 56, in the pixel section 14, covers the polysilicon semiconductor layers 54, which are formed in the regions where the switching elements 26 and capacitors are formed. On the other hand, in the terminal section 20, the gate insulating layer 56 is formed on the buffer layer 52 with the polysilicon layer removed.

Then, the gate electrode 22 is formed on the gate insulating layer 56, over the channel region of the semiconductor layer 54 by sputtering (S22). In this instance, the gate electrode 22 is formed of, for example, molybdenum (Mo) or a tungsten molybdenum alloy (MoW) to a thickness of 200 to 300 nm. The resulting gate electrode 22 acts as part of a common gate line for a plurality of pixels arranged in a line in a horizontal direction in the pixel section 14. Storage capacitor (SC) lines for hold capacitors are also formed in the same step as the gate lines. The hold capacitor is defined by another semiconductor layer 54 formed for the hold capacitor and the line with the gate insulating layer 56 in between. In addition, the lower wire 122 is formed in the terminal section 20 in the same step as the gate electrode 22 is formed in the pixel section 14.

If a p-type channel TFT is used as the switching element of a peripheral circuit, the source and drain regions of the TFT are doped with, for example, boron (S24) after the formation of the gate electrode 22 and the lower wire 122, by boron ion doping through, for example, a resist mask formed by photolithography in regions other than the regions to be doped. The terminal section 20 is not treated in this step (not doped either). If the switching element uses only an n channel TFT, Step S24 is omitted.

Then, a $SiO_2$ single-layer or $SiO_2/Si_xN_y$ multilayer insulating interlayer 60 is formed over the entire surface of the lower glass plate 50 to a thickness of, for example, about 400 to 800 nm by plasma CVD (S26). After the formation of the insulating interlayer 60, the doped regions of the semiconductor layers 54 are activated by activation annealing (by heating) (S28). Thus, the mobility of the carriers in these regions is increased to a sufficient level.

In this instance, the insulating interlayer 60 is formed in both the pixel section 14 and the terminal section 20.

Contact holes are formed in the insulating interlayer 60 and the gate insulating layer 56 by photolithography and dry etching or wet etching, corresponding to the source and drain regions of the semiconductor layer 54 (S30). In this step, the insulating interlayer 60 in the terminal section 20 is also removed larger than in the pixel section 14 from the regions over the lower wire 122. The reason why a larger area is removed from the terminal section is to reduce the connection resistance of the terminal section according to the size of the terminals connected by the COG or OLB technique. Hence, the lower wire 122 is patterned larger than the gate electrode 22 of the pixel section 14 in Step S22.

Then, a connection wire layer 70 for the data line (source electrode) 25 and the pixel connection wire (drain electrode) 24 is formed over the entire surface of the lower glass plate 50 (S32). FIG. 7 shows the structure after this step, and the connection wire layer 70 in this state covers the entire surfaces of the pixel section 14 and the terminal section 20. The connection wire layer 70 has a titanium/aluminum/titanium multilayer structure. The lowermost titanium layer is connected to the semiconductor layer 54 in the pixel section 14 and to the lower wire 122 in the terminal section 20. The intermediate aluminum layer serves as the core of the electroconductive wire and disposed between the lower and upper titanium layers. The connection wire layer 70 fills the contact holes formed above the semiconductor layer 54 and the contact holes formed above the lower wire 122, as shown in FIG. 7. The titanium/aluminum/titanium multilayer structure of the connection wire layer 70 is formed to a thickness of 400 to 800 nm by sputtering.

As mentioned above, the procedure up to Step S32 shown in FIG. 5 is the same as the known technique. FIG. 6 shows a subsequent procedure. FIGS. 8 to 12 each show the structure of a step of the procedure shown in FIG. 6.

Figure 8:
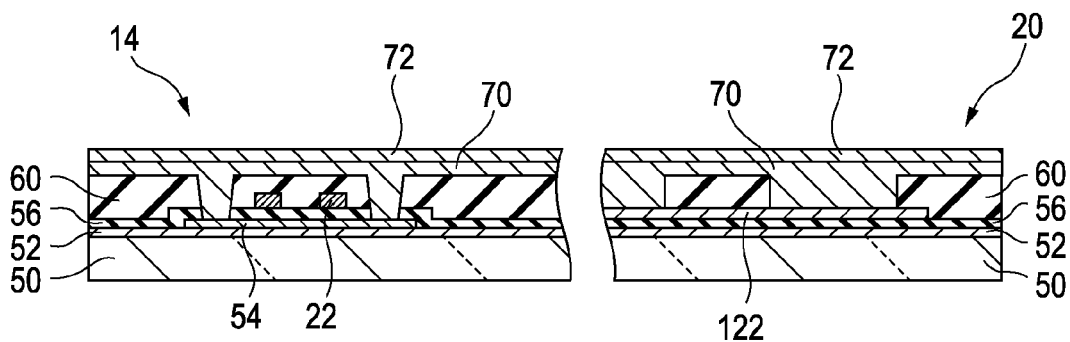
FIG. 8 is a sectional view of Step S34 of the flow chart shown in FIG. 6.

In the procedure shown in FIG. 6, first, a molybdenum film 72 is formed over the entire surface of the lower glass plate 50 (S34). This step continuously follows Step S32 of the procedure shown in FIG. 5. More specifically, a molybdenum/titanium/aluminum/titanium multilayer structure is formed to a thickness of 500 to 900 nm by sputtering. The formation of this four-layer structure is performed with, for example, a continuous sheetfed sputtering apparatus by depositing a titanium layer, an aluminum layer, another titanium layer, and a molybdenum layer in that order subsequent to Step S30. These layers may of course be formed with different dedicated apparatuses. FIG. 8 shows the state in which the molybdenum film 72 covers the entire surface of the connection wire layer 70.

Then, the molybdenum/titanium/aluminum/titanium multilayer structure is formed into multilayer wires by photolithography and dry etching (S36). The dry etching may be performed using, for example, a chlorine-based etching gas. Alternatively, the molybdenum film may be patterned by wet etching, and then the titanium/aluminum/titanium multilayer structure may be patterned with a chlorine-based dry etching gas. For the wet etching of the molybdenum film, an appropriate etchant containing phosphoric acid and nitric acid may be used. Such an etchant may be a so-called PAN solution, which is a mixed solution containing phosphoric acid, nitric acid, and acetic acid.

Figure 9:
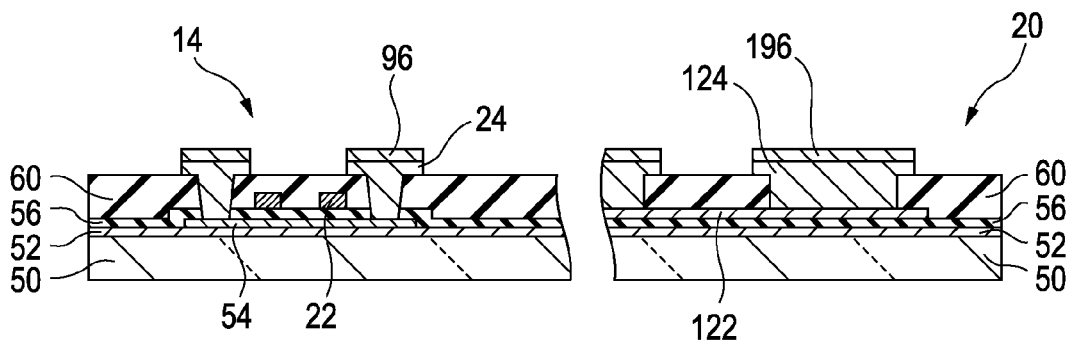
FIG. 9 is a sectional view of Step S36 of the flow chart shown in FIG. 6.

FIG. 9 shows the structure after Step S36. In this structure, the pixel connection wire 24 and the pixel molybdenum film 96 define a multilayer wire portion in the pixel section 14. The multilayer wire portion formed in the pixel section 14 by patterning corresponds to the drain electrode of the switching element 26. In the terminal section 20 as well, the terminal connection wire 124 and the terminal molybdenum film 196 define a multilayer wire portion. The multilayer wire portion formed in the terminal section 20 corresponds to the connection point to which the COG or OLB technique is applied.

Then, a $Si_xN_y$ protective insulating layer 62 is formed over the entire surface of the lower glass plate 50 (S38). Subsequently, a planarizing layer 64 is formed of a photosensitive acrylic resin over the entire surface of the lower glass plate 50. The planarizing layer is patterned by photolithography so as to form a contact hole for the pixel electrode in the planarizing layer 64 and remove the planarizing layer 64 from the terminal section and around it (S40). Further, openings are formed by photolithography in desired regions of the protective insulating layer 62 exposed by forming the openings in the planarizing layer 64 or by removing the planarizing layer 64. Thus, contact holes are formed in the protective insulating layer 62 (S42).

Figure 10:
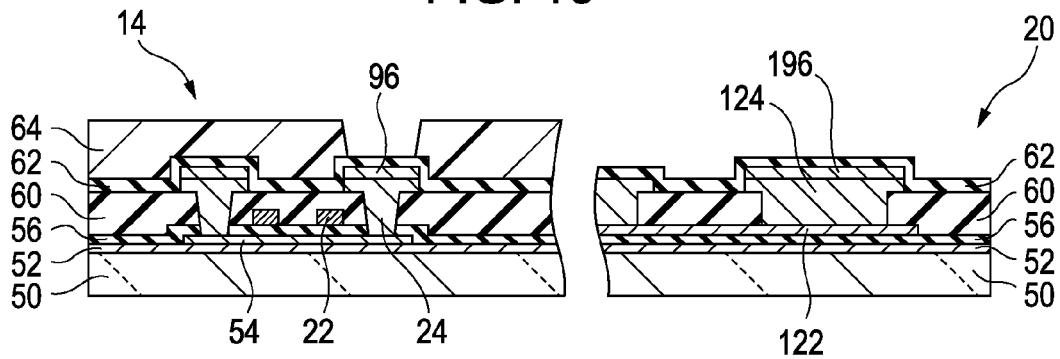
FIG. 10 is a sectional view of a structure in the course of Step S42 of the flow chart shown in FIG. 6.

The openings can be formed by the following procedure. First, the planarizing layer 64 is patterned by photolithography. In the pixel section 14, the portion of the planarizing layer 64 overlying the multilayer wire portion corresponding to the drain electrode defined by the pixel connection wire 24 and the pixel molybdenum film 96 is removed. Also, the portion of the planarizing layer 64 outside the end of the data line 25 of the pixel section 14 is removed; hence, the planarizing layer 64 disposed in the terminal section 20 is completely removed to expose the protective insulating layer 62, as shown in FIG. 10.

Subsequently, the protective insulating layer 62 is patterned. In the pixel section 14, the portion of the protective insulating layer 62 exposed by removing the planarizing layer 64 is removed. In the terminal section 20, the portion of the protective insulating layer 62 overlying the multilayer wire portion defined by the terminal connection wire 124 and the terminal molybdenum film 196, corresponding to the connection point to which the COG or OLB technique is applied is removed. The patterning of the protective insulating layer 62 is performed by dry etching using an etching gas such as $SF_6$ or $CF_4+O_2$, or by wet etching using buffered hydrofluoric acid (BHF).

Figure 11:
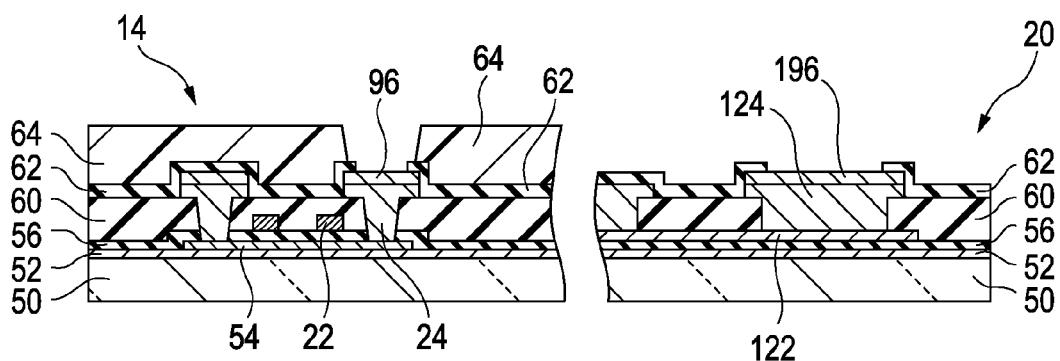
FIG. 11 is a sectional view of the structure after the completion of Step S42 of the flow chart shown in FIG. 6.

The openings are thus formed in desired regions. FIG. 11 shows the structure after forming the openings in the protective insulating layer 62. The planarizing layer 64 has been removed from the terminal section 20, as described above.

Then, the molybdenum films 96 and 196 are cleaned (S44). The oxide film or hydroxide film formed on the surfaces of the molybdenum films can be easily removed by washing with water, so that clean surfaces of the molybdenum films are exposed.

Subsequently, a transparent electroconductive layer is formed of, for example, ITO or IZO on the exposed clean surfaces of the molybdenum films. The transparent electroconductive layer is patterned into transparent electroconductive films 28 and 128 having predetermined shapes by photolithography using, for example, an oxalic acid-based etchant (S46).

Figure 12:
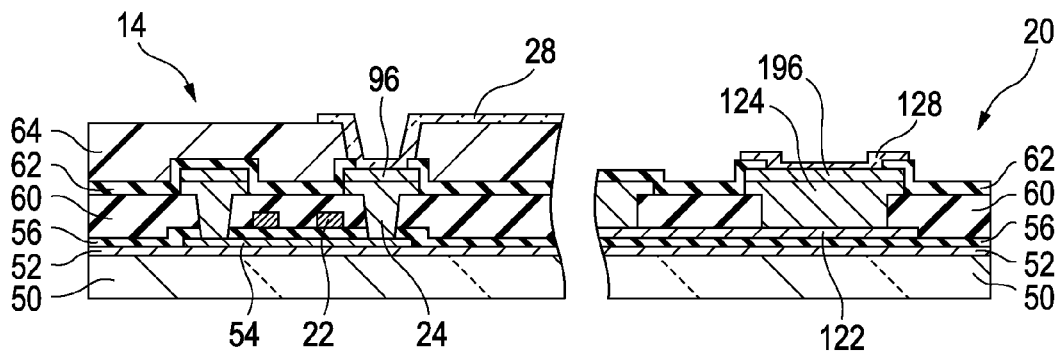
FIG. 12 is a sectional view of Step S46 of the flow chart shown in FIG. 6.

The pixel transparent electroconductive film 28 in the pixel section 14 is used as the pixel electrode. More specifically, the pixel transparent electroconductive film 28 is connected to the multilayer wire portion corresponding to the drain electrode defined by the pixel connection wire 24 and the pixel molybdenum film 96, and spreads over the pixel region on the planarizing layer 64. In the terminal section 20, the terminal transparent electroconductive film 128 is used as the connection point to which the COG or OLB technique is applied. More specifically, the terminal transparent electroconductive film 128 is disposed on the multilayer wire portion defined by the terminal connection wire 124 and the terminal molybdenum film 196 and connected to the lower wire 122. FIG. 12 shows the structure in this state.

As described above, the lower substrate 12 of the liquid crystal display device 10 has molybdenum/titanium/aluminum/titanium multilayer structures as the electroconductive wires in the pixel section 14 and the terminal section 20. The known electroconductive wire has a titanium/aluminum/titanium multilayer structure. The difference between the above two multilayer structures will now be described with reference to FIGS. 13A to 13C and 14A to 14D. The same parts as in FIGS. 1 to 12 in the following description are designated by the same reference numerals and such parts will not be described in detail. Also, the following description will be illustrated using the same reference numerals as in FIGS. 1 to 12.

Figure 13A:
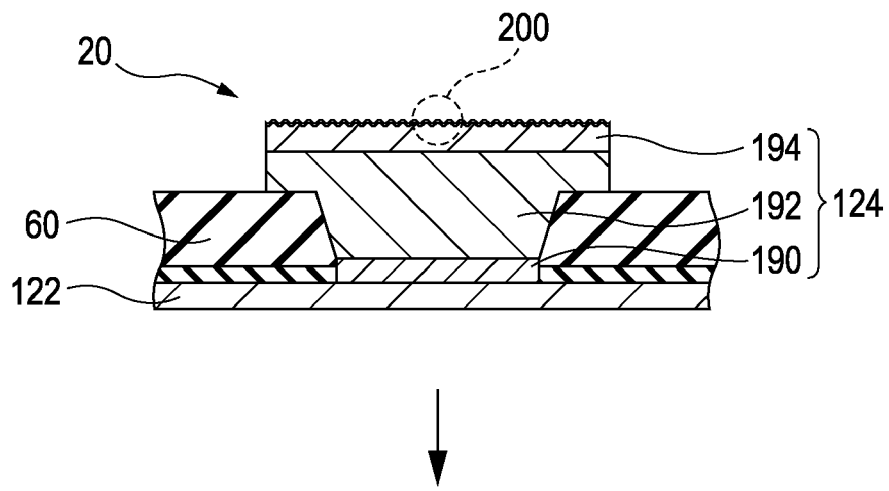
FIGS. 13A to 13C are representations of a known technique shown for describing the effect of a molybdenum film formed in the first embodiment of the invention.
Figure 13B:
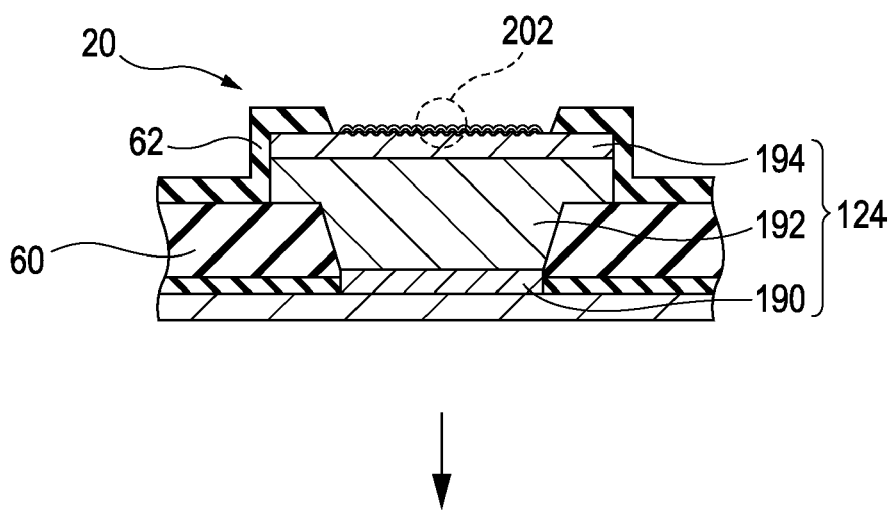
Figure 13C:
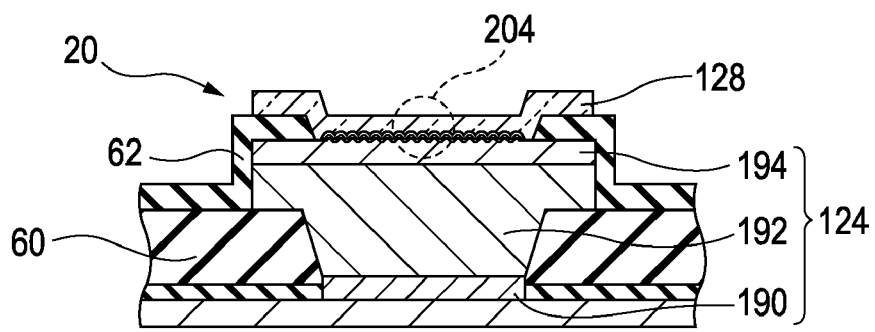

FIGS. 13A to 13C show structures in steps in a procedure for forming the known multilayer wire in the terminal section, from the step of patterning the titanium/aluminum/titanium multilayer wire to the step of forming the transparent electroconductive film. FIGS. 14A to 14D show structures in steps of the procedure of the flow chart shown in FIG. 6 for forming the multilayer structure in the terminal section, after the step of patterning the molybdenum/titanium/aluminum/titanium multilayer structure to the step of forming the transparent electroconductive film.

In the terminal section 20 of the known structure, a connection wire layer 70 having a titanium/aluminum/titanium multilayer structure is formed, as described in Step S32 in FIG. 5. The connection wire layer 70 is then patterned into terminal connection wires 124 by photolithography and dry etching. The dry etching can be performed using a chlorine-based etching gas. FIG. 13A shows the state after this step. In this state, the atmosphere for dry etching forms an oxide coating over the surface of the uppermost titanium layer 194. In addition, a retention time from the step of forming the titanium/aluminum/titanium layers to the step of forming the protective insulating layer 62 helps the formation of the oxide layer. Reference numeral 200 in FIG. 13A designates the interface with the oxide coating.

Then, a protective insulating layer 62 is formed, and an opening is formed in the protective insulating layer 62 corresponding to the terminal connection wire 124. The opening can be formed by, for example, dry etching using an etching gas, such as $SF_6$ or $CF_4+O_2$, as in Step S42 in FIG. 6. FIG. 13B shows the state in this step.

The oxide coating over the uppermost titanium layer is partially removed. However, the $Si_xN_y$ of the protective insulating layer 62 reacts with the etching gas to produce a product on the surface of the uppermost titanium layer 194 in the opening of the protective insulating layer 62. Reference numeral 202 in FIG. 13B designates the interface with the surface product.

Although the detailed composition of the surface product is not clearly known, the surface product is a coating containing an F component and having a thickness in the range of, for example, about 10 to 30 nm. It has been known that the surface product on a titanium surface cannot be easily removed at least by washing with water. Although the surface product can be removed with, for example, a HF-based etchant, such an etchant almost completely removes the uppermost titanium layer. Consequently, the resistance at the interface with the ITO layer is increased, and besides, the ITO layer in the terminal section is formed with an insufficient thickness because of the contact hole formed in an inappropriate shape in the protective insulating layer 62, and accordingly the corrosion resistance in the terminal section is degraded. Thus, the removal of the surface product is difficult to remove.

Then, a terminal transparent electroconductive film 128 is formed with the surface product remaining, as shown in FIG. 13C. As a result, the surface product and the oxide layer remain at the interface between the terminal transparent electroconductive film 128 and the terminal connection wire 124, as the state 204 shown in FIG. 13C.

In the terminal section 20 having the known structure, the surface product and the oxide remaining at the interface between the terminal transparent electroconductive film 128 and the terminal connection wire 124 increase the interface resistance between the terminal transparent electroconductive film 128 and the terminal connection wire 124. Thus, the connection for mounting through the terminals is not easily achieved.

Figure 14A:
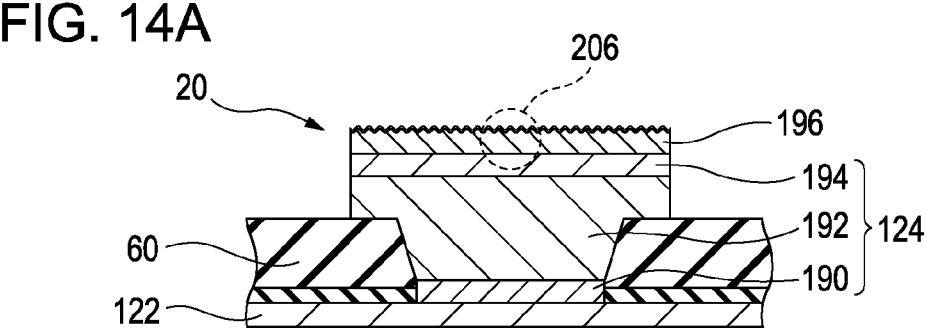
FIGS. 14A to 14D are representations of the effect of the molybdenum film formed in the first embodiment of the invention.
Figure 14B:
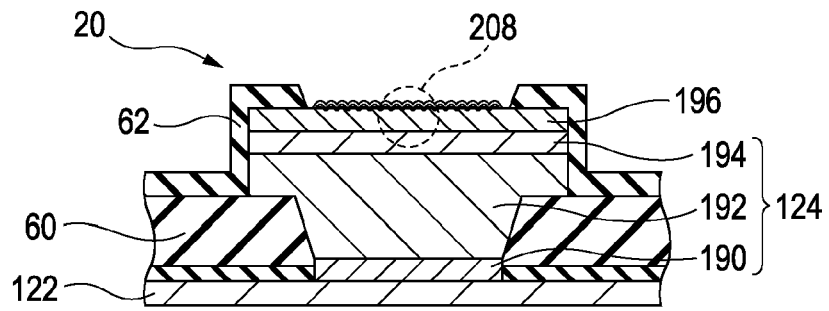
Figure 14C:
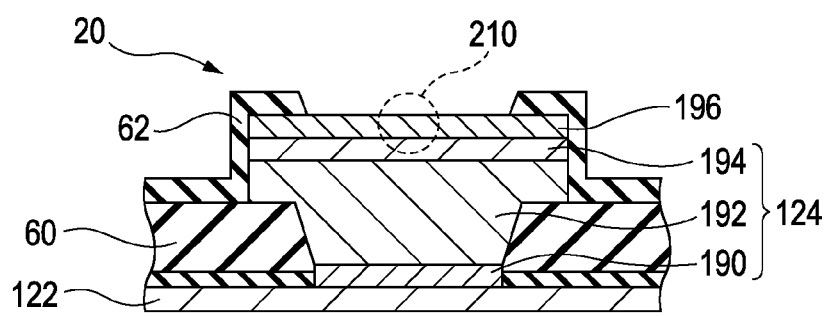

FIGS. 14A to 14D show states of the terminal section 20 in the procedure of the flow chart shown in FIG. 6. FIG. 14A corresponds to Step S36 shown in FIG. 6 and the structure shown in FIG. 9; FIG. 14B corresponds to Step S42 shown in FIG. 6 and the structure shown in FIG. 11; FIG. 14C corresponds to Step S44 shown in FIG. 6; and FIG. 14D corresponds to Step S46 shown in FIG. 6 and the structure shown in FIG. 12.

The terminal section 20 of the present embodiment has a multilayer wire layer having a molybdenum/titanium/aluminum/titanium multilayer structure, as described above. The multilayer wire layer is patterned into the terminal connection wires 124 and the molybdenum films 196 by photolithography and dry etching, as shown in FIG. 14A. The dry etching can be performed using a chlorine-based etching gas, as described above. In this step, the atmosphere for dry etching forms an oxide or hydroxide coating on the surface of the terminal molybdenum film 196; hence, the surface of the terminal molybdenum film 196 is coated with the oxide or hydroxide coating. Reference numeral 206 in FIG. 14A designates the interface with the oxide or hydroxide coating.

Then, the protective insulating layer 62 and the planarizing layer (not shown in FIGS. 14A to 14D) are formed. In the terminal section and its vicinity, the planarizing layer is formed once and then removed completely. Subsequently, an opening is formed in the protective insulating layer 62 corresponding to the terminal molybdenum film 196 and the terminal connection wire 124, as shown in FIG. 14B. For forming the opening in the protective insulating layer 62, dry etching using an etching gas, such as $SF_6$ or $CF_4+O_2$, can be applied as in Step S42 shown in FIG. 6.

The oxide or hydroxide coating on the terminal molybdenum film 196, or the uppermost layer of the multilayer wire portion, is partially removed in this step. However, the reaction of the $Si_xN_y$ of the protective insulating layer 62 with the etching gas and a subsequent ashing step produce a product on the surface of the uppermost layer, or the terminal molybdenum film 196. As mentioned above with reference to FIG. 13B, the detailed composition of the surface product is not clearly known, and the surface product is a coating containing an F component, having a thickness of, for example, about 10 to 30 nm. Reference numeral 208 in FIG. 14B designates the surface state having the surface product in addition to the oxide or hydroxide coating shown in FIG. 14A.

Then, the molybdenum film 196 is washing with water as in Step S44 shown in FIG. 6. The oxide or hydroxide coating on the surface of the molybdenum film can be removed by washing with water. The surface product described with reference to FIG. 14B is formed on the surface of the terminal molybdenum film 196. Since the terminal molybdenum film 196 is coated with oxide or hydroxide, the surface product is also formed on the molybdenum oxide or hydroxide coating. Therefore, the surface product can be removed simultaneously with the removal of the oxide or hydroxide coating by washing with water, as shown in FIG. 14C, by a so-called lift-off effect. Reference numeral 210 in FIG. 14C designates a clean surface of the terminal molybdenum film 196.

Figure 14D:
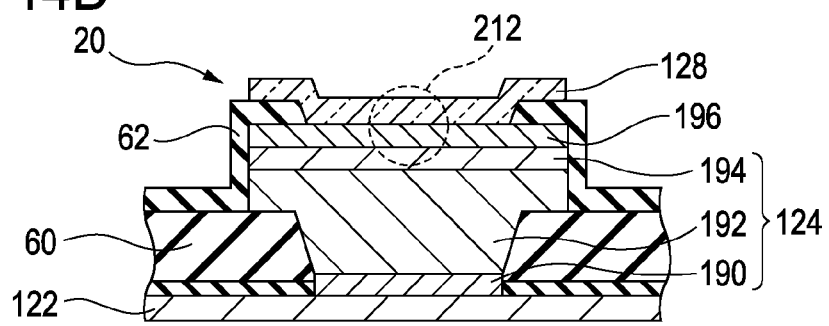

The terminal transparent electroconductive film 128 is formed on the clean surface of the terminal molybdenum film 196 after cleaning, as shown in FIG. 14D. As described above, the transparent electroconductive film is formed of ITO or IZO with hating. However, the terminal molybdenum film 196 between the uppermost titanium layer 194 of the terminal connection wire 124 and the terminal transparent electroconductive film 128 substantially prevents an oxide coating from being formed over the uppermost titanium layer 194 of the terminal connection wire 124. The interfaces in this state are designated by reference numeral 212 in FIG. 14D.

Unlike the known process, the process according to the flow chart shown in FIG. 6 hardly produces the surface product that increases the resistance at the interface between the terminal transparent electroconductive film 128 and the terminal connection wire 124, thus preventing the increase of the interface resistance and facilitating easy connection for mounting through the terminals.

Second Embodiment

In the first embodiment, the molybdenum/titanium/aluminum/titanium multilayer structure may be formed with four dedicated apparatuses for forming the four respective layers. Preferably, however, the multilayer structure is formed with an apparatus capable of continuously forming the four layers from the viewpoint of preventing the increase of the interface resistance between the transparent electroconductive film and the connection wire, reducing the process time, stabilizing the characteristics of the layers. Also, the titanium layer can be prevented from being coated with an oxide film and the interface resistance between the transparent electroconductive film and the connection wire can be reduced, without using such a continuous apparatus, by forming the molybdenum film between the transparent electroconductive film and the connection wire only in the terminal section where the interface resistance should be reduced.

For example, after a titanium/aluminum/titanium multilayer structure is formed with a continuous film-forming apparatus, a protective insulating layer is formed, and then a molybdenum film is formed only in the terminal section, instead of the process of the first embodiment, in which the molybdenum/titanium/aluminum/titanium multilayer structure is formed in both the pixel section and the terminal section with a continuous film forming apparatus. Consequently, the interface resistance between the transparent electroconductive film and the connection wire can be prevented in the terminal section without using a molybdenum/titanium/aluminum/titanium four-layer continuous film forming apparatus.

Figure 15:
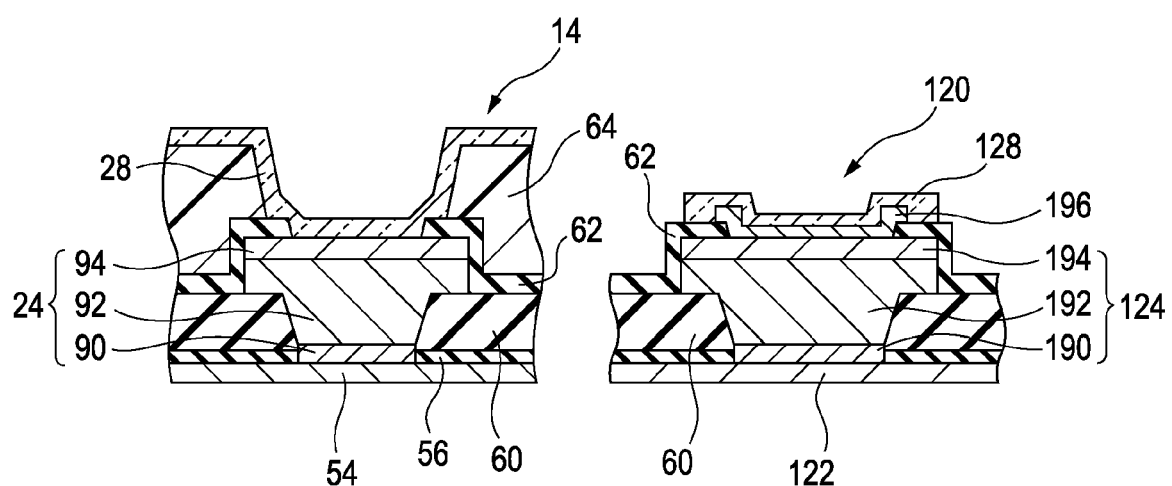
FIG. 15 is a fragmentary sectional view of a liquid crystal display device according to a second embodiment of the invention.
Figure 16:
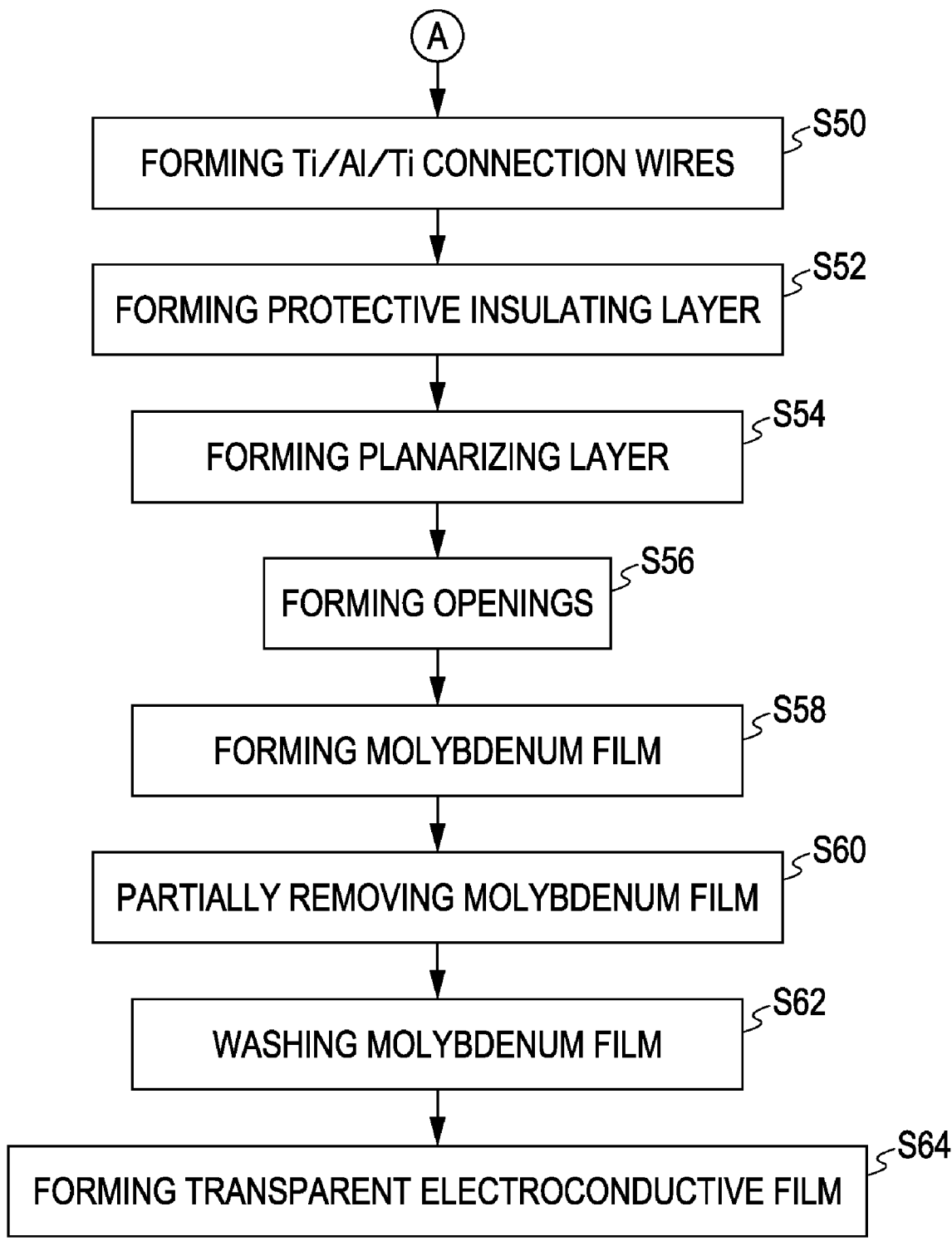
FIG. 16 is a flow chart of the latter half of a procedure for preparing a lower substrate of the liquid crystal display device according to the second embodiment of the invention.

The following description will illustrates such a manufacturing process and a liquid crystal display device produced in such a process with reference to a fragmentary enlarged sectional view shown in FIG. 15, a flow chart shown in FIG. 16, and structural sectional views shown in FIGS. 17 to 22. The same parts as in FIGS. 1 to 14 in the following description are designated by the same reference numerals and such parts will not be described in detail. Also, the following description will be illustrated using the same reference numerals as in FIGS. 1 to 14. The left of the sectional views shown in FIGS. 15, and 17 to 22 shows the pixel section 14 and the right shows the terminal section 20.

FIG. 15, corresponding to FIG. 4, is a fragmentary enlarged sectional view of the multilayer structures of the pixel connection wire 24 and of the terminal connection wire 124 and terminal molybdenum film 196. FIG. 15 omits the upper substrate 13 and the liquid crystal molecule layer 30, and the lower glass plate 50 and buffer layer 52 on the lower substrate 12, as in FIG. 4.

The left of FIG. 15 shows a fragmentary enlarged structure of the pixel connection wire 24 in the pixel section 14. The pixel connection wire 24 is connected to the semiconductor layer 54 exposed through the contact hole formed in the gate insulating layer 56 and the insulating interlayer 60, and includes a titanium layer 90, an aluminum layer 92 and an uppermost titanium layer 94 formed in that order from below. A protective insulating layer 62 and a planarizing layer 64 are formed on the uppermost titanium layer 94, and a contact hole is formed in these insulating layers so as to expose part of the uppermost titanium layer 94. A pixel transparent electroconductive film 28 is disposed to cover the uppermost titanium layer 94 exposed through the contact hole. The pixel transparent electroconductive film 28 is thus connected to the drain of the switching element 26 to serve as the pixel electrode disposed on the planarizing layer 64, as described with reference to FIG. 2.

The right of FIG. 15 shows a fragmentary enlarged structure of the terminal connection wire 124 and the terminal molybdenum film 196 in the terminal section 20. The terminal connection wire 124 is connected to the lower wire 122 disposed on the buffer layer 52 and the gate insulating layer 56 (not shown in FIG. 15). The terminal connection wire 124 is connected to the lower wire 122 exposed through a contact hole formed in the insulating interlayer 60 and includes a titanium layer 190, an aluminum layer 192, and an uppermost titanium 194 formed in that order from below.

Then, the planarizing layer 64 is completely removed from the terminal section 20, and a protective insulating layer 62 is disposed on the uppermost titanium layer 194. The protective insulating layer 62 is provided with a contact hole so as to expose part of the uppermost titanium layer 194. A terminal molybdenum film 196 is formed so as to cover the uppermost titanium layer 194 exposed through the contact hole, and then a terminal transparent electroconductive film 128 is disposed on the terminal molybdenum film 196.

Thus, an electroconductive multilayer structure defined by the pixel connection wire 24 and the pixel transparent electroconductive film 28 is formed in the pixel section 14, and an electroconductive multilayer structure defined by the terminal connection wire 124, the terminal molybdenum film 196, and the terminal transparent electroconductive film 128 is formed in the terminal section 20. More specifically, the electroconductive multilayer structure in the pixel section 14 does not have a molybdenum film between the pixel transparent electroconductive film 28 and the pixel connection wire 24 while the electroconductive multilayer structure in the terminal section 20, where the interface resistance should be reduced, has the terminal molybdenum film 196 between the terminal transparent electroconductive film 128 and the terminal connection wire 124.

The procedure for producing the structure shown in FIG. 15 will now be described with reference to the flow chart shown in FIG. 16 and the structures shown in FIGS. 17 to 22. FIG. 16 is a flow chart of the procedure subsequent to Step S32 in the known process shown in FIG. 5, corresponding to FIG. 6.

In the procedure shown in FIG. 16, first, the titanium/aluminum/titanium multilayer wire layer formed in Step S32 shown in FIG. 5 is patterned into titanium/aluminum/titanium connection wires by photolithography and dry etching (S50). The dry etching can be performed using, for example, a chlorine-based etching gas.

Figure 17:
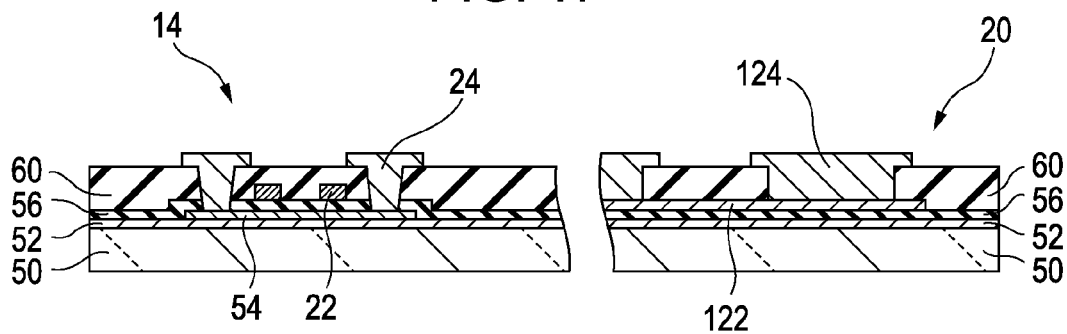
FIG. 17 is a sectional view of Step S50 of the flow chart shown in FIG. 16.

FIG. 17 shows the structure in Step S50. In this step, the multilayer pixel connection wire 24 is formed in the pixel section 14. This multilayer wire formed in the pixel section 14 by patterning corresponds to the drain electrode of the switching element 26. The multilayer terminal connection wire 124 is also formed in the terminal section 20 by patterning. This multilayer wire formed in the terminal section 20 corresponds to the connection point to which the COG or OLB technique is applied.

Then, a $Si_xN_y$ protective insulating layer 62 is formed over the entire surface of the lower glass plate 50 (S52). Subsequently, a planarizing layer 64 is formed of a photosensitive acrylic resin over the entire surface of the lower glass plate 50. The planarizing layer 64 is patterned by photolithography to be removed from the portion in which a contact hole for the pixel section electrode is to be formed and from the terminal section and around it (S54). Further, openings are formed by photolithography in desired regions of the protective insulating layer 62 exposed by removing the planarizing layer 64 (S56).

Figure 18:
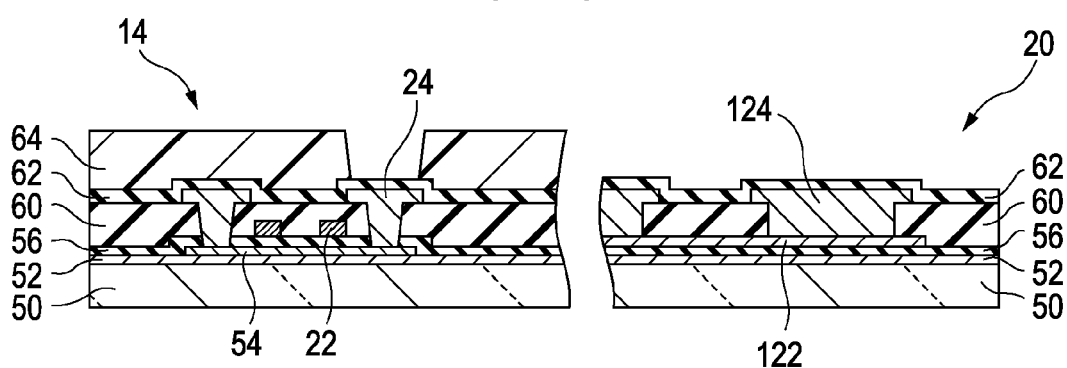
FIG. 18 is a sectional view of a structure in the course of Step S56 of the flow chart shown in FIG. 16.

The openings can be formed by the following procedure. First, the planarizing layer 64 is patterned by photolithography. In the pixel section 14, the portion of the planarizing layer 64 overlying the multilayer pixel connection wire 24 corresponding to the drain electrode is removed. Also, the portion of the planarizing layer 64 outside the end of the data line 25 of the pixel section 14 is removed; hence, the planarizing layer 64 disposed in the terminal section 20 is completely removed to expose the protective insulating layer 62, as shown in FIG. 18.

Then, the protective insulating layer 62 is patterned. In the pixel section 14, the portion of the protective insulating layer 62 exposed by removing the planarizing layer 64 is removed. In the terminal section 20, the protective insulating layer 62 of the multilayer wire portion of the terminal connection wire 124, corresponding to the connection point to which the COG or OLB technique is applied is removed. The patterning of the protective insulating layer 62 is performed by dry etching using an etching gas such as $SF_6$ or $CF_4+O_2$.

Figure 19:
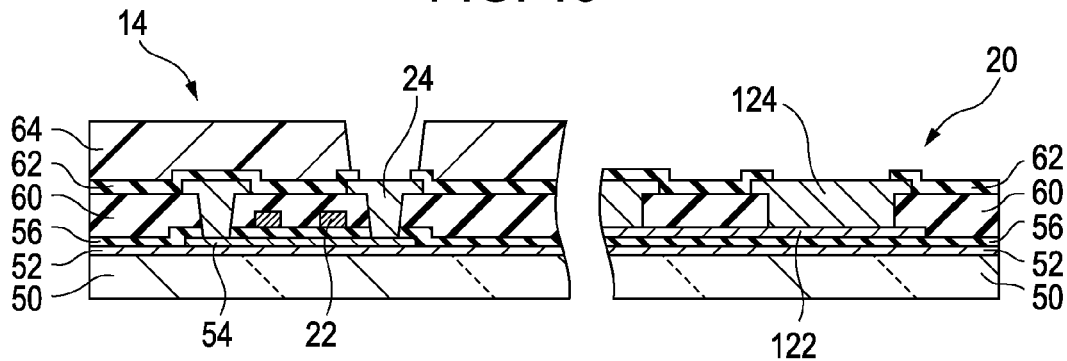
FIG. 19 is a sectional view of the structure after the completion of Step S56 of the flow chart shown in FIG. 16.

The openings are thus formed in desired regions. FIG. 19 shows the structure after forming the openings in the protective insulating layer 62. The planarizing layer 64 has been removed from the terminal section 20, as described above.

Figure 20:
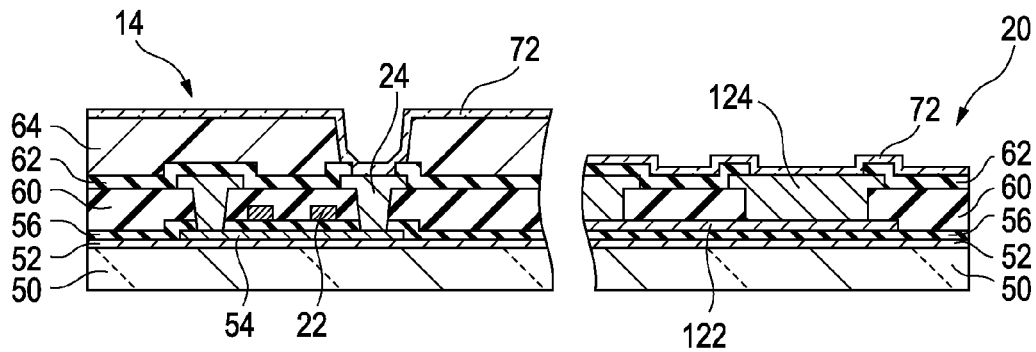
FIG. 20 is a sectional view of Step S58 of the flow chart shown in FIG. 16.

Then, a molybdenum film is formed over the entire surface of the lower glass plate 50 (S58). This step can be performed with a dedicated apparatus for forming the molybdenum film. For example, the molybdenum film may be formed to a thickness of about 100 nm with a sputtering apparatus. FIG. 20 shows the structure in which the molybdenum film 72 spreads over the entire surface, including the surfaces in the openings described with reference to FIG. 19.

Subsequently, the molybdenum film is partially removed (S60). This step patterns the molybdenum film in such a manner that the molybdenum film is left only in the region where the interface resistance should be reduced, and that it is removed from the other region. For example, if the interface resistance of the terminal section 20 should be reduced, the molybdenum film 72 in the terminal section 20 is patterned, and the molybdenum film in the pixel section 14 is removed. The partial removal, or patterning, of the molybdenum film can be performed by wet etching using, for example, an appropriate etchant containing phosphoric acid and nitric acid. Such an etchant may be a so-called PAN solution, which is a mixed solution containing phosphoric acid, nitric acid, and acetic acid.

Figure 21:
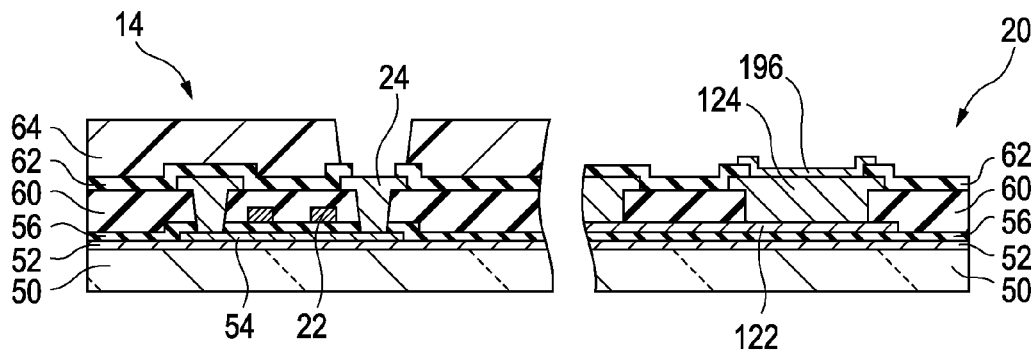
FIG. 21 is a sectional view of Step S60 of the flow chart shown in FIG. 16.

FIG. 21 shows the structure in which the molybdenum film has been partially removed. In this structure, the molybdenum film has been completely removed from the pixel section 14 and the terminal molybdenum film 196 remains on the terminal connection wire 124 in the terminal section 20.

In the procedure described up to here, the protective insulating layer is formed (S52), then the planarizing layer is patterned (S54), and subsequently contact holes are formed in the protective insulating layer (S56). Subsequently, the molybdenum film is formed (S58) and then partially removed (S60). Alternatively, after the formation of the protective insulating layer (S52), contact holes may first be formed in the protective insulating layer (S56). Subsequently, the molybdenum film is formed (S58) and is then partially removed (S60), and finally, the planarizing layer is patterned (S54). This procedure provides the same connection structure and produces the same effect. If the molybdenum film is left in the pixel section in the step of partially removing the molybdenum (S60), the same structure and the same effect as in the first embodiment can be produced.

Then, the molybdenum film is washed with water to remove an oxide or hydroxide coating formed on the surface of the terminal molybdenum film 196 and thus to expose a clean surface of the molybdenum film (S62), in the same manner as in Step S44 shown in FIG. 6.

Figure 22:
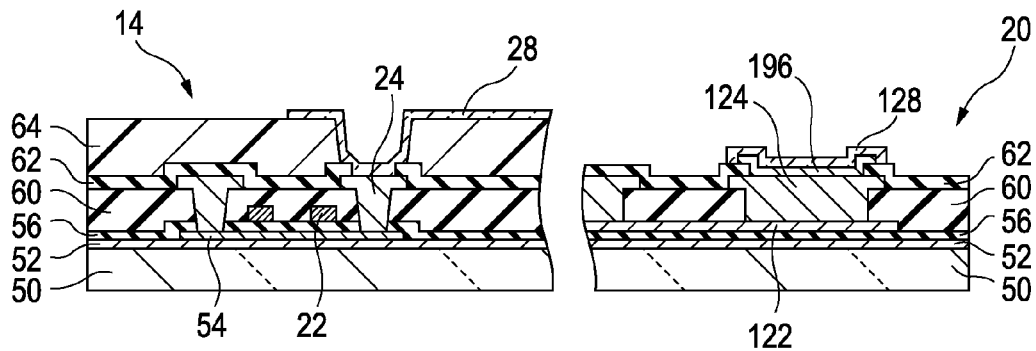
FIG. 22 is a sectional view of Step S64 of the flow chart shown in FIG. 16.

A transparent electroconductive layer is formed of, for example, ITO or IZO on the exposed clean surface of the terminal molybdenum film 196 in the terminal section 20. The transparent electroconductive layer is patterned into transparent electroconductive films 28 and 128 having predetermined shapes by photolithography using, for example, an oxalic acid-based etchant, as shown in FIG. 22 (S64).

The pixel transparent electroconductive film 28 is thus disposed on the pixel connection wire 24 including the uppermost titanium layer and is used as the pixel electrode in the pixel section 14. The terminal molybdenum film 196 is disposed between the terminal transparent electroconductive film 128 and the terminal connection wire 124 in the terminal section 20. This structure prevents the uppermost titanium layer of the terminal connection wire 124 from being oxidized by the thermal history during forming the transparent electroconductive film, thus reducing the interface resistance between the terminal transparent electroconductive film 128 and the terminal connection wire 124.

Third Embodiment

In the above-described embodiments, a molybdenum film is provided as an interlayer between the transparent electroconductive film and the connection wire including the titanium-containing uppermost layer. As an alternative to the molybdenum film, another electroconductive material layer capable of being wet-etched may be used as the interlayer. While the surface product or deposit on the molybdenum film can be removed by washing with water, the surface product or deposit on the interlayer made of an electroconductive material capable of being we-etched can also be removed easily. The transparent electroconductive film is made of ITO (indium tin oxide) or IZO (indium zinc oxide), and ITO and IZO can be wet-etched. Hence, an ITO or IZO film can be used as the interlayer instead of the molybdenum film to reduce the interface resistance.

In a third embodiment, the pixel transparent electroconductive film and the terminal transparent electroconductive film are formed of ITO and the interlayer is formed of IZO. ITO may of course be used for the interlayer. If the pixel transparent electroconductive film and the terminal transparent electroconductive film are formed of IZO, the interlayer may be formed of ITO or IZO.

Figure 23:
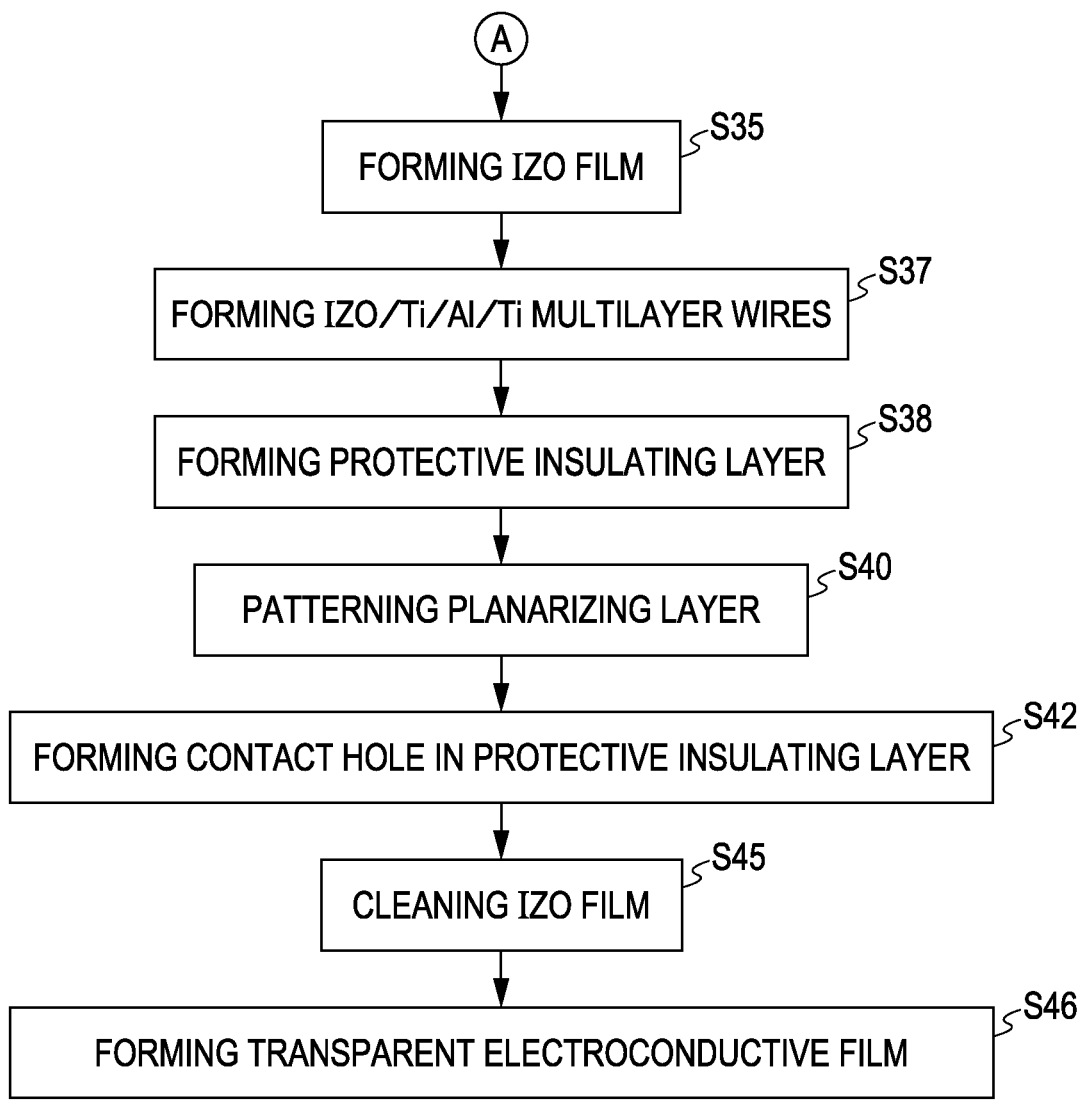
FIG. 23 is a flow chart of the latter half of a procedure for preparing a lower substrate of an electro-optic device according to a third embodiment of the invention.

For use of an IZO interlayer, the same process as described with reference to FIG. 5 is applied up to the formation of the titanium/aluminum/titanium connection wire layer. FIG. 23 is a flow chart of the procedure subsequent to Step S32 shown in FIG. 5 in which the titanium/aluminum/titanium connection wire layer is formed.

The flow chart shown in FIG. 23 is the same as the flow chart shown in FIG. 6 illustrating the procedure using a molybdenum film as the interlayer, except that the molybdenum is replaced with an IZO film. The structures in steps of this procedure are also the same as the structures shown in FIGS. 8 to 12 using the molybdenum film as the interlayer, except that the molybdenum film 72 is replaced with an IZO film. The following procedure will be described with reference to FIG. 23, focusing on the differences from the structure using the molybdenum film. Each structure in the steps of the procedure will be shown in the corresponding figure, but not described in detail. In the following description, the same reference numerals as those used in FIGS. 1 to 22 are used.

As shown in FIG. 23, first, an IZO film is formed over the entire surface of the lower glass plate 50 (S35). This step continuously follows Step S32 shown in FIG. 5 in practice. More specifically, the IZO film is formed subsequent to the formation of the titanium/aluminum/titanium multilayer structure by sputtering. The resulting IZO/titanium/aluminum/titanium multilayer structure has a thickness of about 500 to 900 nm in total. This four-layer structure may be formed with, for example, a continuous sheetfed sputtering apparatus by depositing a titanium layer, an aluminum layer, another titanium layer, and an IZO layer in that order subsequent to Step S30.

Preferably, the introduction of oxygen is minimized during the formation of the IZO film. Thus, the uppermost titanium layer of the connection wire layer can be prevented as much as possible from being oxidized during the formation of the IZO film. The structure corresponding to Step S35 is shown in FIG. 8 and in which the molybdenum film 72 is replaced with the IZO film, indicating that the IZO film is disposed over the entire surface of the connection wire layer 70.

Then, IZO/titanium/aluminum/titanium multilayer wires are formed by photolithography and dry etching (S37). The dry etching can be performed using, for example, a chlorine-based etching gas. Alternatively, the IZO film may be patterned by wet etching and then the titanium/aluminum/titanium multilayer structure may be patterned with a chlorine-based dry etching gas. For the wet etching of the IZO film, an appropriate etchant containing phosphoric acid and nitric acid may be used. Such an etchant may be a so-called PAN solution, which is a mixed solution containing phosphoric acid, nitric acid, and acetic acid.

The structure corresponding to Step S37 is shown in FIG. 9 and in which the pixel molybdenum film 96 and the terminal molybdenum film 196 are replaced with a pixel IZO film and a terminal IZO film, respectively. More specifically, the pixel connection wire 24 and the pixel IZO film define a multilayer wire portion in the pixel section 14. The multilayer wire portion corresponds to the drain electrode of the switching element 26. In the terminal section 20 as well, the terminal connection wire 124 and the terminal IZO 196 define a multilayer wire portion. The multilayer wire portion formed by patterning in the terminal section 20 corresponds to the connection point to which the COG or OLB technique is applied.

Then, a $Si_xN_y$ protective insulating layer 62 is formed over the entire surface of the lower glass plate 50 (S38). The IZO film is not crystallized by heat for forming the protective insulating layer, for example, by heat for CVD; hence, the IZO film can easily be removed by wet etching performed below. Subsequently, a planarizing layer 64 is formed of a photosensitive acrylic resin over the entire surface of the lower glass plate 50. The planarizing layer 64 is patterned by photolithography so as to form a contact hole for the pixel electrode in the planarizing layer and remove the planarizing layer 64 from the terminal section and around it (S40). Further, openings are formed by photolithography in desired regions of the protective insulating layer 62 exposed by forming the contact hole in the planarizing layer 64 or by removing the protective insulating layer. Thus, contact holes are formed in the protective insulating layer 62 (S42). These steps are performed in the same manner as those shown in FIG. 6.

The formation of the openings is performed in the same manner as the step shown in FIG. 6. More specifically, the planarizing layer 64 is first patterned by photolithography. In the pixel section 14, the planarizing layer 64 overlying the multilayer wire portion corresponding to the drain electrode defined by the pixel connection wire 24 and the pixel IZO film is removed. Also, the portion of the planarizing layer 64 outside the end of the data line 25 of the pixel section 14 is removed; hence, the planarizing layer 64 disposed in the terminal section 20 is completely removed to expose the protective insulating layer 62. FIG. 10 shows the structure corresponding to this step.

Subsequently, the protective insulating layer 62 is patterned. In the pixel section 14, the portion of the protective insulating layer 62 exposed by removing the planarizing layer 64 is removed. In the terminal section 20, the portion of the protective insulating layer 62 overlying the multilayer wire portion defined by the terminal connection wire 124 and the terminal IZO film, corresponding to the connection point to which the COG or OLB technique is applied is removed. The patterning of the protective insulating layer 62 is also performed in the same manner by dry etching using an etching gas such as $SF_6$ or $CF_4+O_2$, or by wet etching using buffered hydrofluoric acid (BHF). Since the uppermost titanium layer of the connection wire is covered with the IZO film in the region where openings are to be formed in the protective insulating layer 62 by patterning, the titanium layer is not affected by a product produced by patterning the protective insulating layer 62.

The openings are thus formed in desired regions. FIG. 11 shows a structure corresponding to the state in which desired openings are formed in the protective insulating layer 62 with the planarizing layer 64 removed from the terminal section 20. The resist used for forming the openings is removed by ashing and wet separation.

Then, the IZO film is cleaned (S45). The cleaning in this step is intended to remove the surface layer of the IZO film by wet etching, but not to remove the IZO film completely. Since the IZO film is not crystallized by heat for forming the protective insulating layer, the surface layer of the IZO film can easily be removed by wet etching. Consequently, the product deposited on the surface of the IZO film can easily be removed to expose a clean surface of the IZO film.

Wet etching may be applied to the IZO film cleaning, or light surface etching. For this wet etching, an appropriate etchant containing phosphoric acid and nitric acid may be used. Such an etchant may be a so-called PAN solution, which is a mixed solution containing phosphoric acid, nitric acid, and acetic acid. Since titanium is not dissolved in or damaged by the PAN solution, the uppermost titanium layer of the connection wire is hardly affected even by excessive wet etching.

After the clean surface of the IZO film is exposed, a transparent electroconductive layer is formed. This is performed in the same manner as step S46 in FIG. 6, using ITO for the transparent electroconductive layer. The resulting transparent electroconductive layer is patterned into transparent electroconductive films having predetermined shapes by photolithography using, for example, an oxalic acid-based etchant (S46).

The pixel transparent electroconductive film 28 in the pixel section 14 is used as the pixel electrode. More specifically, the pixel transparent electroconductive film 28 is connected to the multilayer wire portion corresponding to the drain electrode defined by the pixel connection wire 24 and the pixel IZO film, and spreads over the pixel region on the planarizing layer 64. In the terminal section 20, the terminal transparent electroconductive film 128 is used as the connection point to which the COG or OLB technique is applied. More specifically, the terminal transparent electroconductive film 128 is disposed on the multilayer wire portion defined by the terminal connection wire 124 and the terminal IZO film and connected to the lower wire 122. FIG. 12 shows the corresponding structure in this step.

Figure 24A:
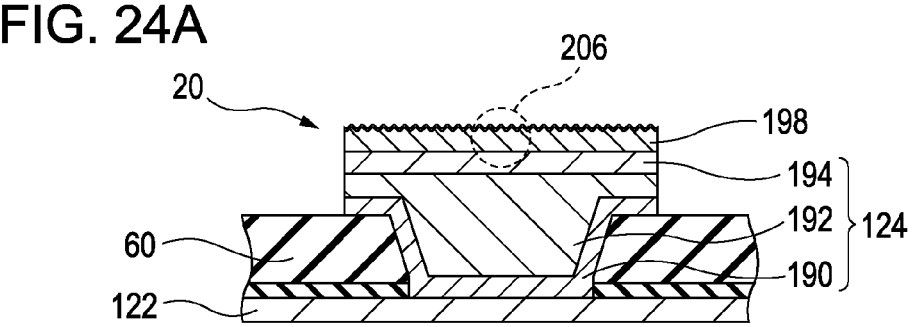
FIGS. 24A to 24D are representations of the effect of an IZO film formed in the embodiment shown in FIG. 23.
Figure 24B:
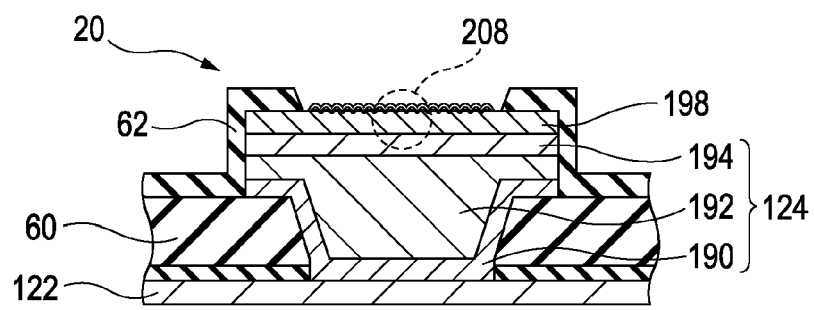
Figure 24C:
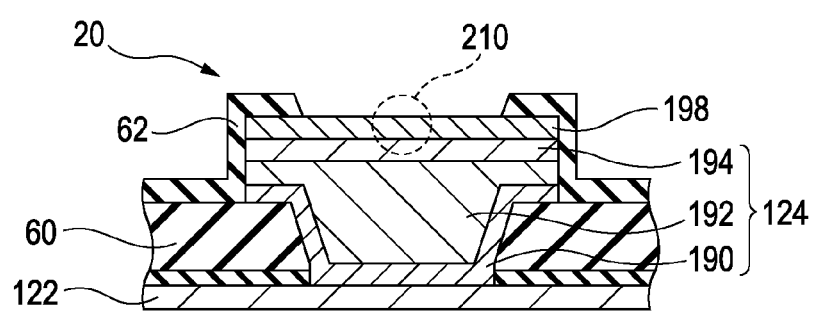

FIGS. 24A to 24D show states of the terminal section 20 in steps of the procedure of the flow chart shown in FIG. 23, corresponding to FIGS. 14A to 14D. FIG. 24A corresponds to Step 37 shown in FIG. 23 and the structure shown in FIG. 9; FIG. 24B corresponds to Step S42 shown in FIG. 23 and the structure shown in FIG. 11; FIG. 24C corresponds to step S45 shown in FIG. 23; and FIG. 24D corresponds to Step S46 shown in FIG. 23 and the structure shown in FIG. 12. In the following description, the same parts as in FIGS. 1 to 22 in the following description are designated by the same reference numerals and the IZO film is designated by another reference numeral.

As described above, the IZO/titanium/aluminum/titanium multilayer structure is formed in. This multilayer structure is patterned into the terminal connection wires 124 and the terminal IZO films 198 by photolithography and dry etching. For the patterning by dry etching, a chlorine-based etching gas can be used. FIG. 24A shows the state after this step. In this state, the atmosphere for dry etching forms an oxide coating or the like over the surface of the terminal IZO film 198. Reference numeral 206 in FIG. 24A designates the interface with the oxide coating.

Then, the protective insulating layer 62 is formed. The IZO film is not crystallized by heat for forming the protective insulating layer 62, as described above. Subsequently, a planarizing layer (not shown) is formed. In the terminal section and its vicinity, the planarizing layer is formed once and then removed completely. Subsequently, an opening is formed in the protective insulating layer 62 corresponding to the terminal IZO film 198 and the terminal connection wire 124, as shown in FIG. 24B. For forming the opening in the protective insulating layer 62, dry etching using an etching gas, such as $SF_6$ or $CF_4+O_2$, can be applied as in Step S42 shown in FIG. 6.

The oxide coating or the like on the uppermost layer, or the terminal IZO film 198, is partially removed in this step. However, the reaction of the $Si_xN_y$ of the protective insulating layer 62 with the etching gas and a subsequent ashing step produce a product on the surface of the uppermost layer, or the terminal IZO film 198. As mentioned above with reference to FIG. 13B, the detailed composition of the surface product is not clearly known, and the surface product is a coating containing an F component, having a thickness of, for example, about 10 to 30 nm. Reference numeral 208 in FIG. 24B designates the surface state having the surface product in addition to the oxide coating shown in FIG. 24A.

Then, the surface coating of the IZO film is removed by the cleaning, or wet etching, described in Step S45 in FIG. 23. Thus, the oxide coating or the like on the surface of the terminal IZO film 198 can be removed. The surface product described with reference to FIG. 24B is formed on the surface of the terminal IZO film 198. Since the surface of the terminal IZO film 198 is coated with oxide or the like, the surface product is also formed on the oxide coating or the like of the IZO film 198. When the IZO film is removed in this step, the surface product can be removed together with the oxide coating or the like overlying the IZO film by a so-called lift off effect, as shown in FIG. 24C. Reference numeral 210 designates a clean surface of the terminal IZO film 198.

Figure 24D:
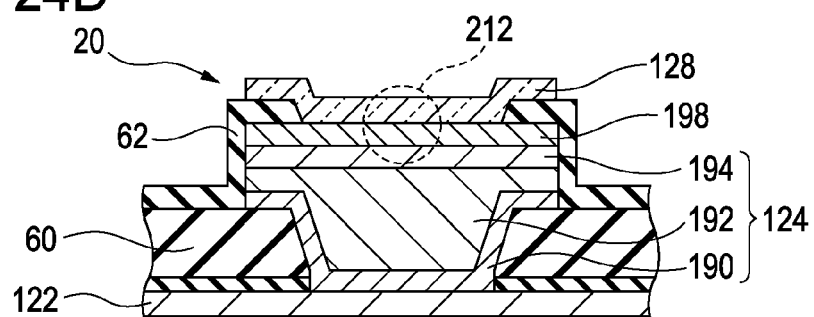

The terminal transparent electroconductive film 128 is formed on the clean surface of the terminal IZO film 198, as shown in FIG. 24D. As described above, the transparent electroconductive film is formed of ITO with heating. The terminal IZO film 198 between the uppermost titanium layer 194 of the terminal connection wire 124 and the terminal transparent electroconductive film 128 prevents an oxide coating from being formed over the surface of the uppermost titanium layer 194. The interface between the transparent electroconductive film 128 and the terminal connection wire 124 in this state is designated by reference numeral 212 in FIG. 24D.

The process of the flow chart shown in FIG. 23 takes an advantage that IZO is not crystallized by heat for forming a $Si_xN_y$ layer and, consequently, can be removed by wet etching, which does not damage the titanium layer. Thus, the process of the present embodiment hardly produces the surface product that increases the resistance at the interface between the terminal transparent electroconductive film 128 and the terminal connection wire 124, unlike the known process. Thus, the process of the present embodiment can prevent the increase of the interface resistance between the terminal transparent electroconductive film 128 and the terminal connection wire 124 and facilitates easy connection for mounting through the terminals.

The technique in which an interlayer made of an electroconductive material capable of being wet-etched is used as an alternative to the molybdenum film may be applied to the structure describe with reference to FIGS. 15 and 16, that is, the structure in which the interlayer between the transparent electroconductive film and the connection wire is disposed only in the terminal section where the interface resistance should be reduced. This will be described below using the same reference numerals as in FIGS. 1 to 24D.

Fourth Embodiment

Figure 25:
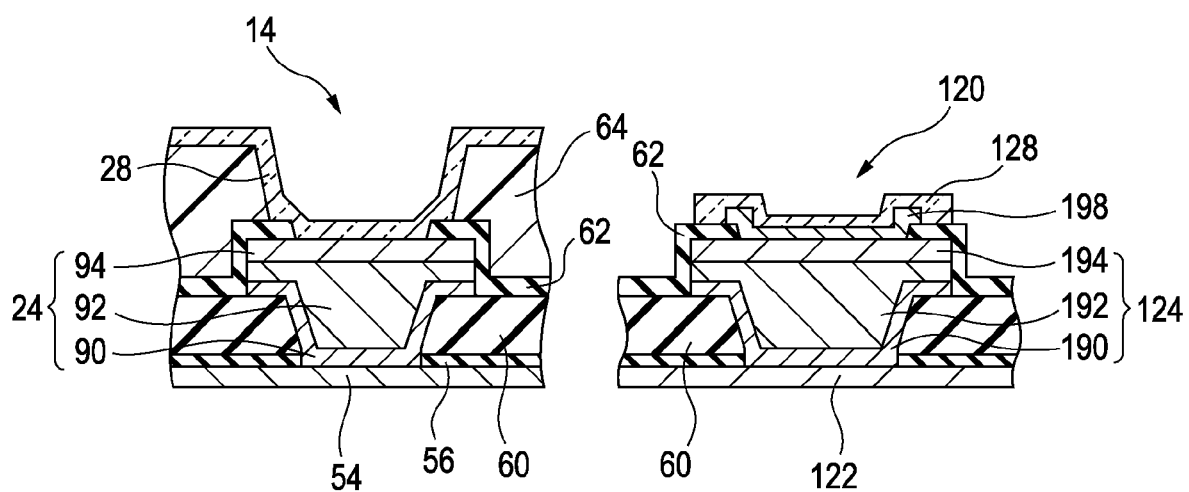
FIG. 25 is a sectional view of multilayer structures of an electro-optic device according to a fourth embodiment of the invention.

FIG. 25, corresponding to FIG. 15, is a fragmentary enlarged sectional view of multilayer structures of the pixel connection wire 24 and of the terminal connection wire 124 and terminal IZO film 196. The left of FIG. 25 shows a fragmentary enlarged structure of the pixel connection wire 24 in the pixel section 14. The right of FIG. 25 shows a fragmentary enlarged structure of the terminal connection wire 124 and the terminal IZO film 198 in the terminal section 20. Hence, FIG. 25 shows a structure in which the terminal molybdenum film 196 shown in FIG. 15 is replaced with the terminal IZO film 198.

More specifically, an electroconductive multilayer structure defined by the pixel connection wire 24 and the pixel transparent electroconductive film 28 is formed in the pixel section 14, and an electroconductive multilayer structure defined by the terminal connection wire 124 and the terminal IZO film 198, and the terminal transparent electroconductive film 128 is formed in the terminal section 20, as in the structure shown in FIG. 15. Thus, the electroconductive multilayer structure in the pixel section 14 does not have an IZO film between the pixel transparent electroconductive film 28 and the pixel connection wire 24 while the electroconductive multilayer structure in the terminal section 20, where the interface resistance should be reduced, has the terminal IZO film 198 between the terminal transparent electroconductive film 128 and the terminal connection wire 124.

Figure 26:
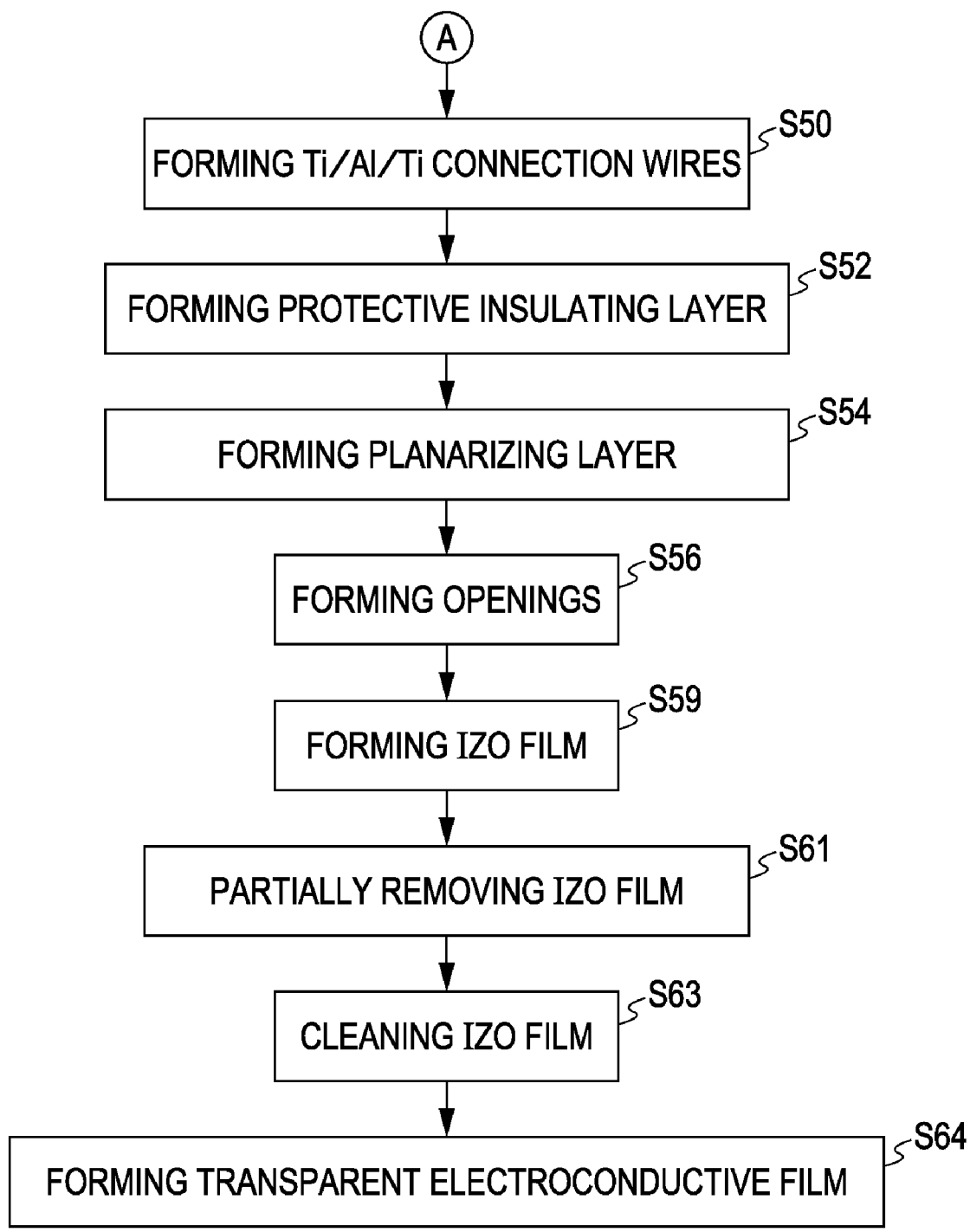
FIG. 26 is a flow chart of the latter half of a procedure for preparing the lower substrate of the electro-optic device according to the fourth embodiment.

The procedure for producing the structure shown in FIG. 25 will now be described with reference to the flow chart shown in FIG. 26. The flow chart shown in FIG. 26 shows the same procedure as that shown in FIG. 16 using the molybdenum film as the interlayer, except that the molybdenum film is replaced with an IZO film. The structures in steps of this procedure are the same as the structures shown in FIGS. 17 to 22 using the molybdenum film as the interlayer, except that the molybdenum film is replaced with the IZO film. The following procedure will be described with reference to the flow chart shown in FIG. 26, focusing on the differences from the structure using the molybdenum film. Each structure corresponding to the steps of the procedure will be shown in a corresponding figure, but not described in detail. In the following description, the same reference numerals as those used in FIGS. 1 to 25 are used.

As shown in FIG. 26, first, the titanium/aluminum/titanium multilayer connection wire layer formed in Step S32 shown in FIG. 5 is patterned into titanium/aluminum/titanium connection wires by photolithography and dry etching (S50). This step is performed in the same manner as Step S50 of FIG. 16, and FIG. 17 shows the corresponding structure of this step.

Then, a $Si_xN_y$ protective insulating layer 62 is formed over the entire surface of the lower glass plate 50 (S52). Subsequently, a planarizing layer 64 is formed of a photosensitive acrylic resin over the entire surface of the lower glass plate 50. The planarizing layer 64 is patterned by photolithography so as to form a contact hole for the pixel section electrode in the planarizing layer 64 and to remove the planarizing layer 64 from the terminal section and around it (S54). Further, openings are formed by photolithography in desired regions of the protective insulating layer 62 exposed by removing the planarizing layer 64 (S56). These steps are performed in the same manner as those shown in FIG. 16, and the openings are formed in the same manner. FIG. 18 shows the corresponding structure in which the planarizing layer 64 has been patterned to be removed completely from the terminal section 20 and thus to expose the protective insulating layer 62. FIG. 19 shows the corresponding structure after forming the openings in the protective insulating layer 62.

Then an IZO film is formed over the entire surface of the lower glass plate 50 (S59). This step can be performed with a dedicated apparatus for forming the IZO film. For example, the IZO film may be formed to a thickness of about 100 nm with a sputtering apparatus. The corresponding structure is shown in FIG. 20. FIG. 20 shows a structure in which the IZO film substituted for the molybdenum film 72 spreads over the entire surface, filling the openings described with reference to FIG. 19.

Subsequently, the IZO film is partially removed (S61). This step patterns the IZO film in such a manner that the IZO film is left only in the region where the interface resistance should be reduced, and that it is removed from the other region. For example, if the interface resistance of the terminal section 20 should be reduced, the IZO film in the terminal section 20 is patterned in a desired shape and the IZO film in the pixel section 14 is removed. The partial removal, or patterning, of the IZO film can be performed by wet etching using, for example, an appropriate etchant containing phosphoric acid and nitric acid. Such an etchant may be a so-called PAN solution, which is a mixed solution containing phosphoric acid, nitric acid, and acetic acid.

The structure shown in FIG. 21 corresponds to the structure in which the IZO film substituted for the molybdenum film has been partially removed. In this instance, the IZO film has been completely removed from the pixel section 14 and the terminal IZO film 198 remains on the terminal connection wire 124 in the terminal section 20.

In the procedure above, after the formation of the protective insulating layer (S52), the planarizing layer is patterned (S54) and then contact holes are formed in the protective insulating layer (S56), as described with reference to FIG. 16. Subsequently, the IZO film is formed (S59) and then partially removed (S61). Alternatively, after the formation of the protective insulating layer (S52) contact holes may first be formed in the protective insulating layer (S56). Subsequently, the IZO film is formed (S59) and is then partially removed (S61), and finally, the planarizing layer is patterned (S54). This procedure provides the same connection structure and produces the same effect. If the IZO film is left in the pixel section in the step of partially removing the IZO film (S61), the same structure and the same effect as in the foregoing first and third embodiments can be produced.

Then, the IZO film is cleaned (S63). The cleaning in this step is intended to remove the surface coating of the IZO film by wet etching, but not to remove the IZO film completely, as in Step S45 shown in FIG. 23. Since the IZO film is not crystallized by heat for forming the protective insulating layer, the surface coating of the IZO film can easily be removed by wet etching. Consequently, products deposited on the surface of the IZO film can easily be removed to expose a clean surface of the IZO film.

The cleaning of the IZO film, or etching the surface of the IZO film, may be performed by wet etching. For this wet etching, an appropriate etchant containing phosphoric acid and nitric acid may be used. Such an etchant may be a so-called PAN solution, which is a mixed solution containing phosphoric acid, nitric acid, and acetic acid. Since titanium is not dissolved in or damaged by the PAN solution, the uppermost titanium layer of the connection wire is hardly affected even by excessive wet etching.

After the clean surface of the IZO film is exposed, a transparent electroconductive layer is formed in the same manner as Step S64 in FIG. 16, using ITO for the transparent electroconductive layer. The transparent electroconductive layer is patterned into transparent electroconductive films having predetermined shapes by photolithography using, for example, an oxalic acid-based etchant (S64). FIG. 22 shows a structure corresponding to this state.

Thus, the pixel transparent electroconductive film 28 is disposed on the pixel connection wire 24 including the uppermost titanium layer in the pixel section 14 and is used as the pixel electrode. In the terminal section 20, the IZO film is disposed between the terminal transparent electroconductive film 128 and the terminal connection wire 124. This structure can prevent the uppermost titanium layer of the terminal connection wire 124 from being oxidized by heat for forming the transparent electroconductive film, and thus reducing the interface resistance between the terminal transparent electroconductive film 128 and the terminal connection wire 124.

Fifth Embodiment

Figure 27:
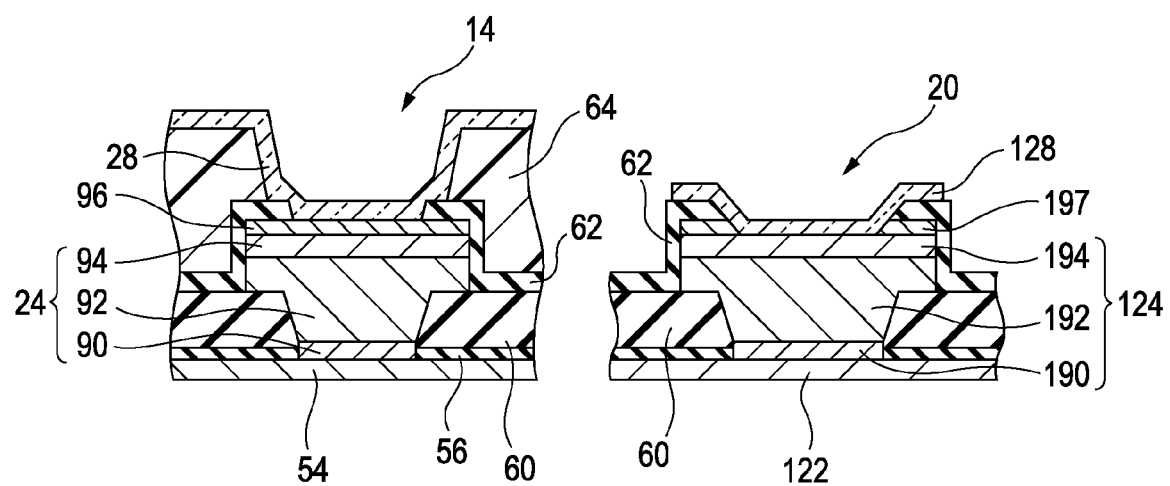
FIG. 27 is a fragmentary enlarged view of the multilayer structures in the pixel section and the terminal section according to the fourth embodiment.

The terminal section 20 of the electro-optic device of a fifth embodiment has a multilayer structure in which the molybdenum film in the first embodiment is partially removed, as shown in FIG. 27.

The procedure up to the step of forming the connection wire layer having the titanium/aluminum/titanium multilayer structure is the same as the procedure of the first embodiment and is performed according to the flow chart shown in FIG. 5.

Figure 28:
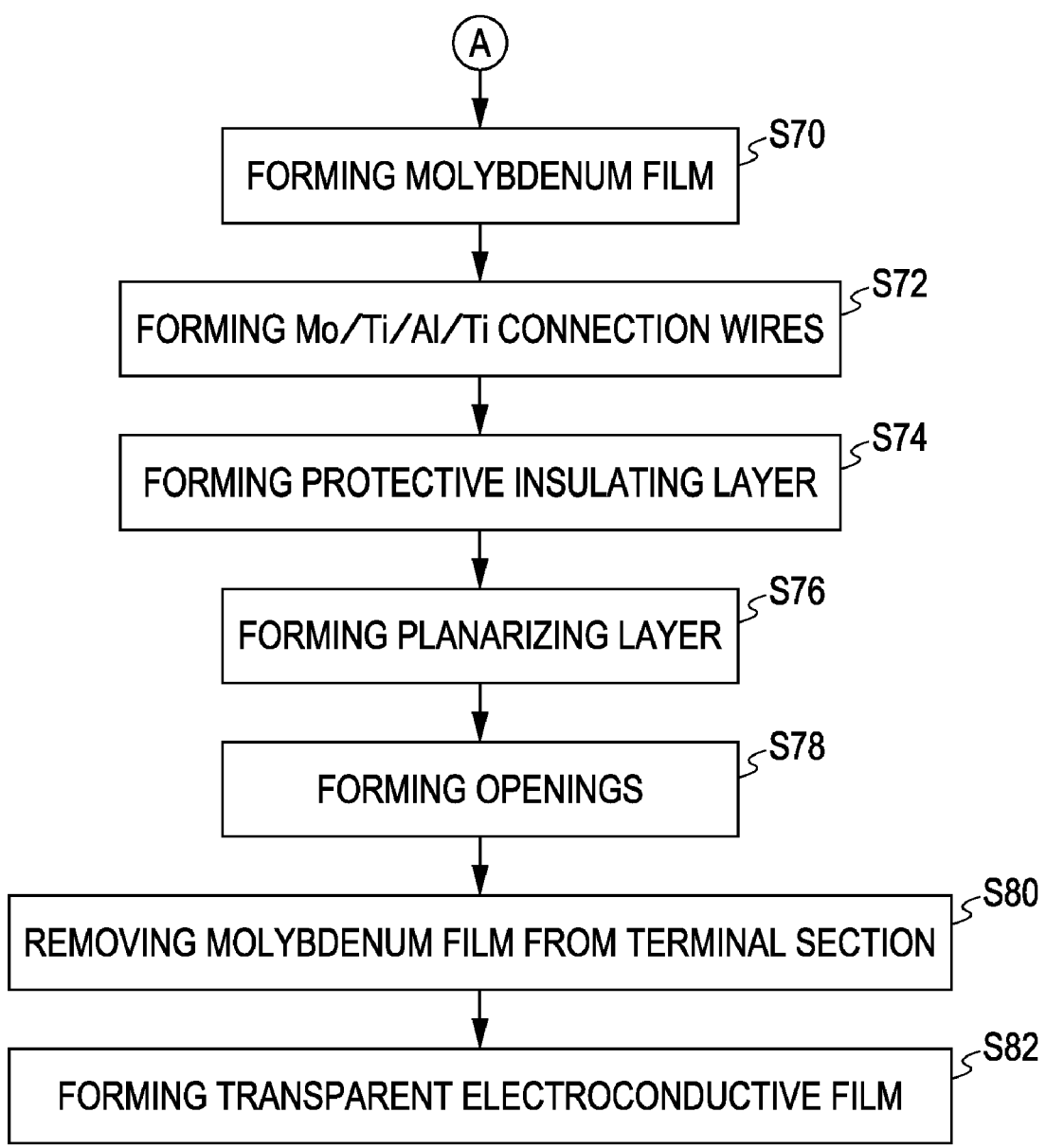
FIG. 28 is a flow chart of the latter half of a procedure for preparing the lower substrate of an electro-optic device according to a fifth embodiment of the invention.
Figure 29:
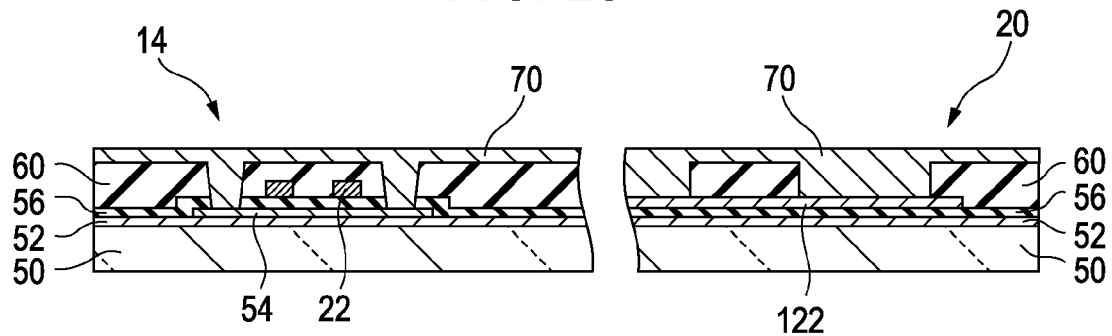
FIG. 29 is a sectional view of Step S32 of the flow chart shown in FIG. 5.
Figure 30:
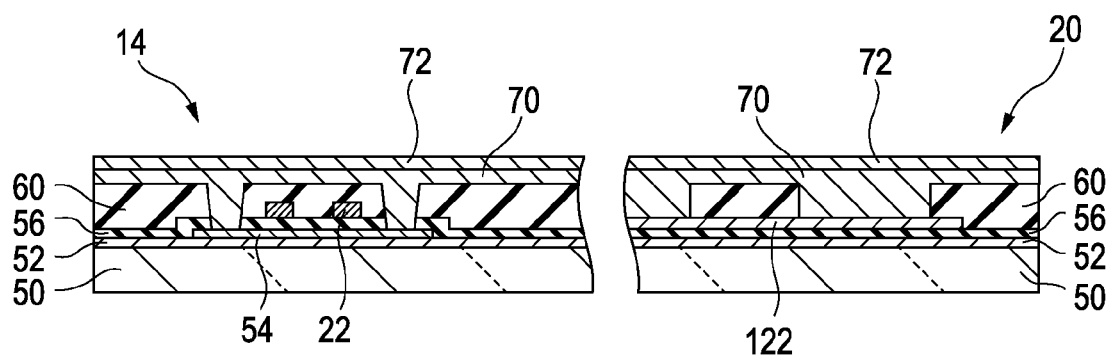
FIG. 30 is a sectional view of Step S70 of the flow chart shown in FIG. 28.

FIG. 28 shows a flow chart of the subsequent procedure, and FIGS. 29 to 35 show structures of the corresponding steps.

The steps of the procedure shown in FIG. 28 up to the step of forming openings in the planarizing layer (S70 to S78) or the steps shown in FIGS. 29 to 33 are the same as Steps S34 to S42 of the procedure according to the first embodiment shown in FIG. 6 or the steps shown in FIGS. 7 to 11.

Figure 33:
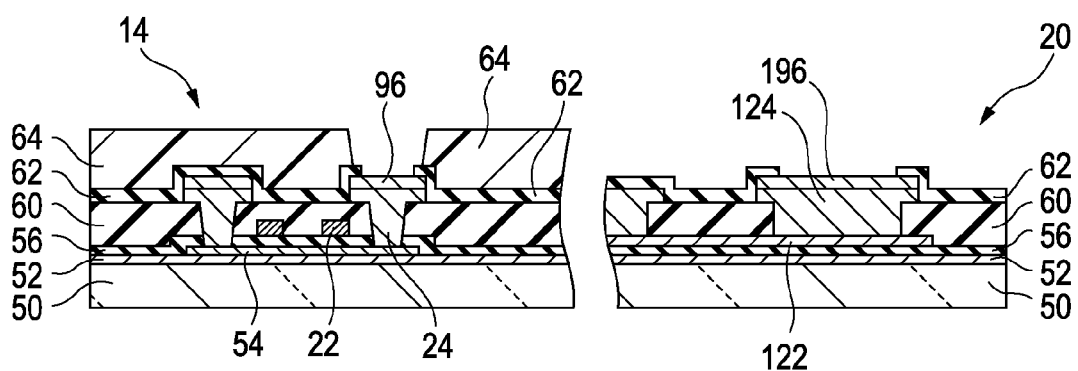
FIG. 33 is a sectional view of the state after the completion of Step 78 of the flow chart shown in FIG. 28.

FIG. 33 shows openings formed in the protective insulating layer 62. The planarizing layer 64 has been removed from the terminal section 20.

Figure 34:
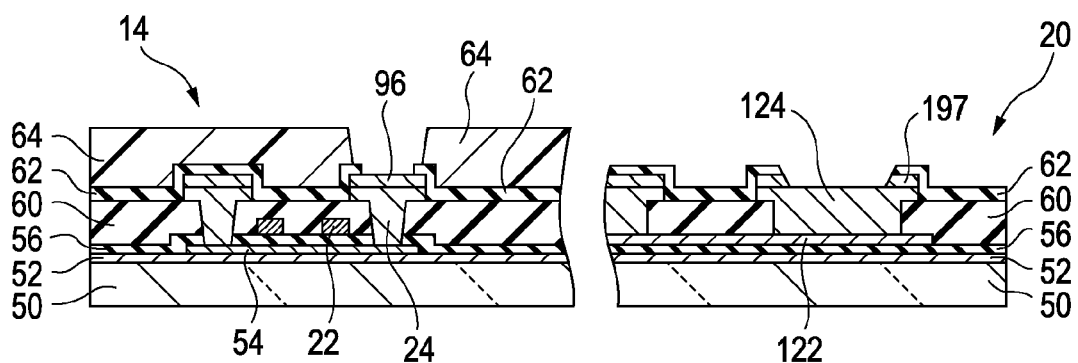
FIG. 34 is a sectional view of Step S80 of the flow chart shown in FIG. 28.

Then, the molybdenum film 196 is removed from the terminal section 20 (S80). This step is performed using the protective insulating layer 62 as a mask. More specifically, an opening having substantially the same area as the opening formed in the protective insulating layer 62 in Step S78 is formed in the terminal molybdenum film 196. Thus, the resulting terminal molybdenum film has an opening (the terminal molybdenum film having the opening is designated by reference numeral 197). Hence, the terminal molybdenum film 197 remains only under the protective insulating layer 62 with the same opening as the opening in the protective insulating layer 62. This opening acts as a contact hole and the uppermost titanium layer 194 of the terminal connection wire 124 is exposed through the contact hole, as shown in FIG. 34. The portions of the terminal section 20 thus patterned correspond to the connection points to which the COG or OLB technique is applied.

The molybdenum film is removed only from the terminal section 20. The pixel molybdenum film 96 in the pixel section 14 is left as it is. The removal, or patterning, of the molybdenum film can be performed by wet etching using, for example, an appropriate etchant containing phosphoric acid and nitric acid. Such an etchant may be a so-called PAN solution, which is a mixed solution containing phosphoric acid, nitric acid, and acetic acid.

Then, a transparent electroconductive layer is formed of, for example, ITO or IZO. The transparent electroconductive layer is patterned into transparent electroconductive films having predetermined shapes by photolithography using, for example, an oxalic acid-based etchant (S82).

Figure 35:
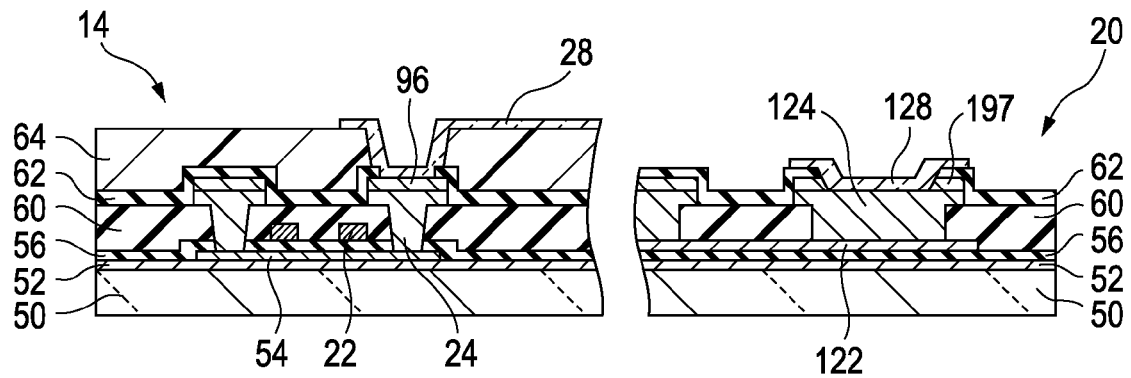
FIG. 35 is a sectional view of Step S82 of the flow chart shown in FIG. 28.

The pixel transparent electroconductive film 28 in the pixel section 14 is used as the pixel electrode. More specifically, the pixel transparent electroconductive film 28 is connected to the multilayer wire portion corresponding to the drain electrode defined by the pixel connection wire 24 and the pixel molybdenum film 96, and spreads over the pixel region overlying the planarizing layer 64. In the terminal section 20, the terminal transparent electroconductive film 128 is used as the connection point to which the COG or OLB technique is applied. More specifically, the terminal transparent electroconductive film 128 is disposed on the terminal connection wire 124 connected to the lower wire 122. The terminal molybdenum film 197 is substantially not connected to the terminal transparent electroconductive film 128, as shown in FIG. 35.

Thus, in the lower substrate 12 of the liquid crystal display device 10 of the present embodiment, the pixel section 14 and the terminal section 20 are formed using molybdenum/titanium/aluminum/titanium multilayer structures as the electroconductive wires. In this instance, the molybdenum film in the terminal section 20 is removed corresponding to the opening formed in the protective insulating layer 62 after the formation of the molybdenum/titanium/aluminum/titanium multilayer structure. In the known process, the electroconductive wire is defined by a titanium/aluminum/titanium multilayer structure. The differences between the effects of those multilayer structures will now be described with reference to FIGS. 36 and 37. The same parts as in FIGS. 29 to 35 in the following description are designated by the same reference numerals and such parts will not be described in detail. Also, the following description will be illustrated using the same reference numerals as in FIGS. 29 to 35.

Figure 36A:
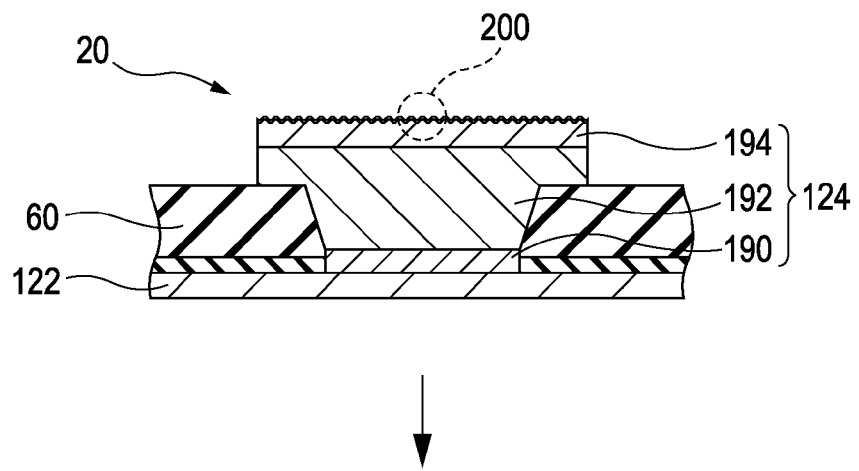
FIGS. 36A and 36B are representations of a known technique shown for describing the effect of a molybdenum film formed in the fifth embodiment of the invention.
Figure 36B:
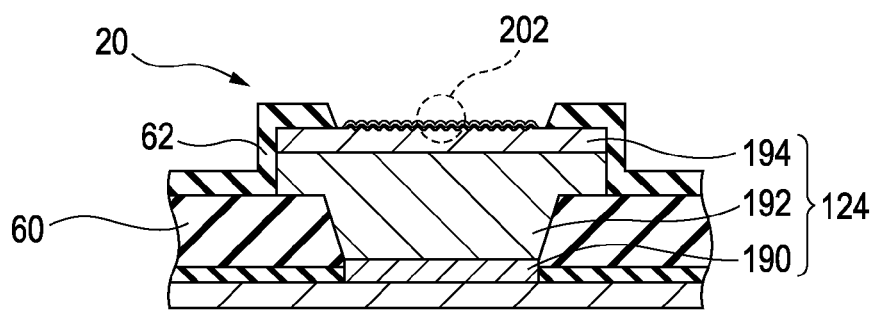
Figure 37A:
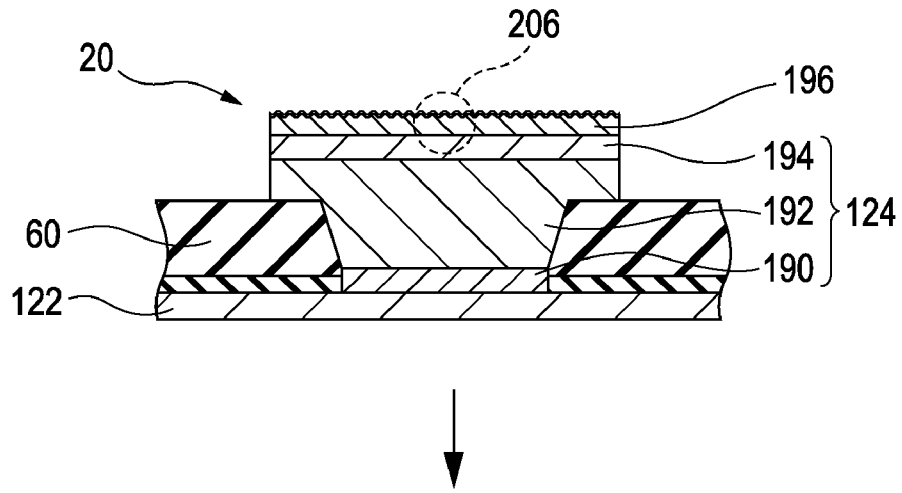
FIGS. 37A to 37C are representation of the effect of the molybdenum film formed in the fifth embodiment.
Figure 37B:
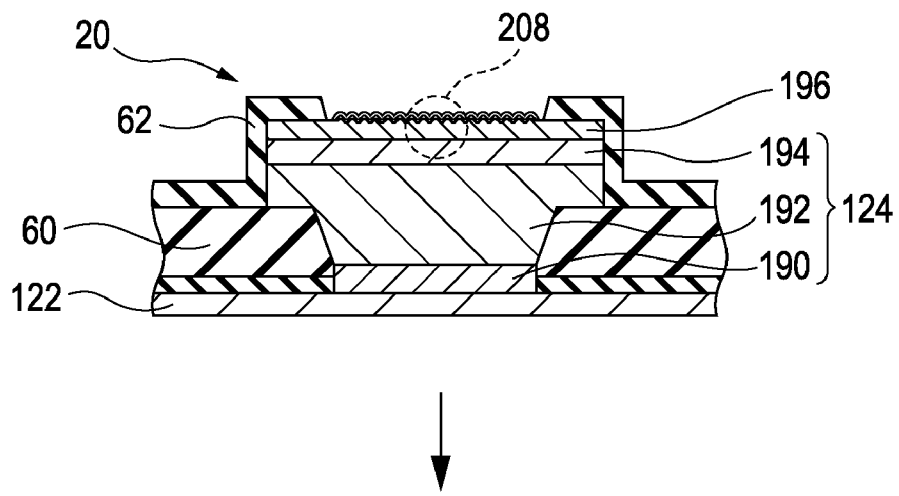
Figure 37C:
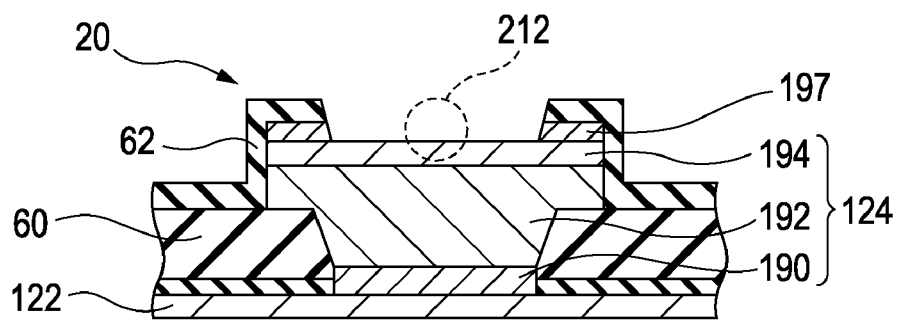

FIGS. 36A and 36B show the structures in steps of the known process after the step of forming the titanium/aluminum/titanium multilayer wire by patterning to the step of forming an opening in the protective insulating layer 62 of the multilayer wire of the known terminal section. FIGS. 37A to 37C show the structures in steps of the procedure of the flow chart shown in FIG. 28 for forming a multilayer wire layer, after the step of patterning the molybdenum/titanium/aluminum/titanium multilayer wire layer to the step of forming an opening in the protective insulating layer 62.

In the known terminal section 20, a connection wire layer 70 having a titanium/aluminum/titanium multilayer structure is formed as in the description of Step S32 shown in FIG. 5. The connection wire layer 70 is patterned into terminal connection wires 124 by photolithography and dry etching using, for example, a chlorine-base etching gas, as shown in FIG. 36A. In this instance, the atmosphere for dry etching forms an oxide coating over the surface of the uppermost titanium layer 194. Reference numeral 200 in FIG. 36A designates the interface with the oxide coating.

Then, a protective insulating layer 62 is formed, and an opening is formed in the protective insulating layer 62 corresponding to the terminal connection wire 124. The opening can be formed by, for example, dry etching using an etching gas, such as $SF_6$ or $CF_4+O_2$, as in Step S78 in FIG. 28. FIG. 36B shows the state after this step.

In this step, the oxide coating over the uppermost titanium layer is partially removed. However, the $Si_xN_y$ of the protective insulating layer 62 reacts with the etching gas to form a product on the surface of the uppermost titanium layer 194. Reference numeral 202 in FIG. 36B designates the interface with the surface product.

The surface product is a coating containing fluorine (F), titanium (Ti), oxygen (O), or other components and has a thickness of, for example, about 10 to 30 nm. It has been known that the surface product on a titanium surface cannot be easily removed at least by washing with water. Although the surface product can be removed with, for example, an HF (hydrogen fluoride)-based etchant, such an etchant removes the uppermost titanium layer to a large extent. The removal of the surface product is difficult to remove.

Then, a terminal transparent electroconductive film 128 is formed. If it is formed with the surface product remaining, the interface resistance between the terminal transparent electroconductive film 128 and the terminal connection wire 124 is increased, and thus, connection through the terminals may not easily be achieved.

FIGS. 37A to 37C show states of the terminal section 20 in steps of the procedure of the flow chart shown in FIG. 28. FIG. 37A corresponds to Step S72 shown in FIG. 28 and the structure shown in FIG. 31; FIG. 37B corresponds to step S78 shown in FIG. 28 and the structure shown in FIG. 33; and FIG. 37C corresponds to Step S80 shown in FIG. 28 and the structure shown in FIG. 34.

In the present embodiment, as described above, a multilayer wire layer defined by a molybdenum/titanium/aluminum/titanium multilayer structure is formed, and is patterned into the terminal connection wires 124 and the terminal molybdenum films 196 by photolithography and dry etching. For the patterning by dry etching, a chlorine-based etching gas can be used, as described above. FIG. 37A shows the state after this step. In this step, the atmosphere for dry etching forms an oxide coating on the surface of the terminal molybdenum film 196; hence, the surface of the terminal molybdenum film 196 is coated with the oxide coating. Reference numeral 206 in FIG. 37A designates the interface with the oxide coating.

Then, a protective insulating layer 62 is formed, and an opening is formed in the protective insulating layer 62 corresponding to the terminal molybdenum film 196 and the terminal connection wire 124. For forming the opening in the protective insulating layer 62, dry etching using an etching gas, such as $SF_6$ or $CF_4+O_2$, can be applied as in Step S78 shown in FIG. 28. FIG. 37B shows the state after this step.

In this step, the reaction of the $Si_xN_y$ of the protective insulating layer 62 with the etching gas produces a product on the surface of the uppermost layer, or the terminal molybdenum film 196. Although the detailed composition of the surface product is not clearly known, the surface product is a coating containing an F component and having a thickness of, for example, about 10 to 30 nm, as described with reference to FIG. 36B. Reference numeral 208 shown in FIG. 37B designates the interface with the surface product in addition to the state shown in FIG. 37A.

Then, the molybdenum film 196 is removed from the terminal section 20, as described in Step S80 shown in FIG. 28. The removal, or patterning, of the molybdenum film 196 can be performed by wet etching using, for example, a PAN solution, as described above. In this instance, the protective insulating layer 62 may be used as a mask for removing the molybdenum film. More specifically, the portion of the molybdenum film exposed through the opening formed in the protective insulating layer 62 is removed, and the surface product on the molybdenum film is also removed together with the molybdenum film. Thus, the uppermost titanium layer 194 of the terminal connection wire 124 is exposed, as shown in FIG. 37C. Reference numeral 212 shown in FIG. 37C designates the surface of the uppermost titanium layer 194 exposed by removing the molybdenum film and the surface product together. Subsequently, a terminal transparent electroconductive film 128 is formed on the exposed surface.

Thus, the procedure of the flow chart shown in FIG. 28 allows the removal of the surface product produced by dry-etching the protective insulating layer 62. Consequently, only a very small amount of surface product remains between the terminal transparent electroconductive film 128 and the terminal connection wire 124. Thus, the increase of the interface resistance between the terminal transparent electroconductive film 128 and the terminal connection wire 124 can be prevented and easy connection can be achieved through the terminals, in comparison with the known process.

Sixth Embodiment

In the fifth embodiment, a molybdenum film is provided as an interlayer between the connection wire including the uppermost titanium layer and the transparent electroconductive film. The molybdenum film may be replaced with an interlayer made of an electroconductive material capable of being wet-etched. The transparent electroconductive film is made of ITO or IZO, which can be wet-etched. Hence, and an ITO or IZO film can be used as the interlayer instead of the molybdenum film to reduce the interface resistance.

In the present embodiment, the pixel transparent electroconductive film and the terminal transparent electroconductive film are made of ITO, and the interlayer is made of IZO. The interlayer may of course be made of ITO. Alternatively, the pixel transparent electroconductive film and the terminal transparent electroconductive film may be made of IZO. In this instance, the interlayer may be made of ITO or IZO.

Figure 38:
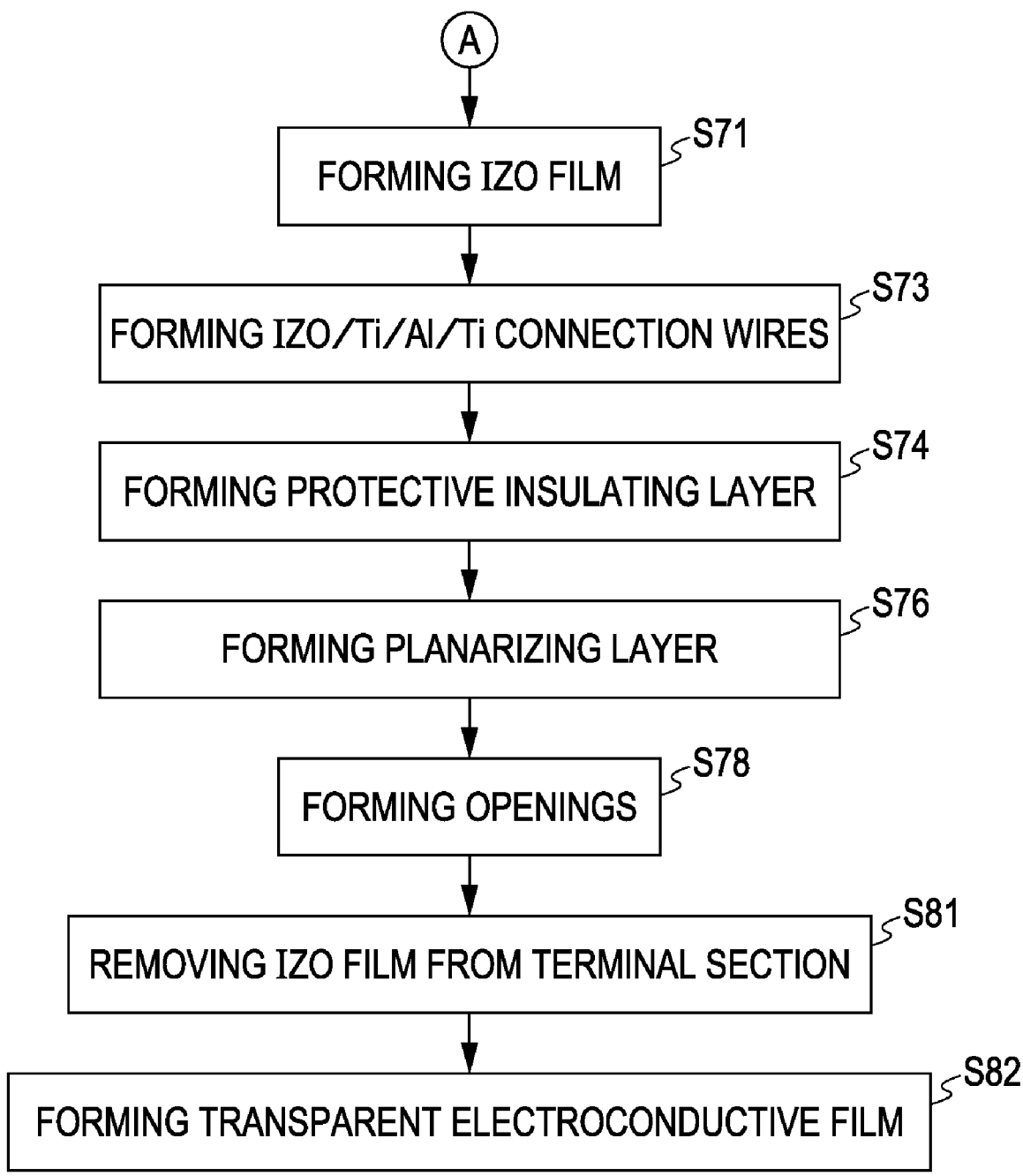
FIG. 38 is a flow chart of the latter half of a procedure for preparing the lower substrate according to a sixth embodiment of the invention.

For an IZO interlayer, the procedure is the same as that described with reference to FIG. 5 up to the step of forming the titanium/aluminum/titanium connection wire layer. FIG. 38 is a flow chart of the procedure subsequent to Step S32 shown in FIG. 5 for forming the titanium/aluminum/titanium connection wire layer.

The flow chart shown in FIG. 38 is the same as the flow chart shown in FIG. 28 illustrating the procedure using a molybdenum film as the interlayer, except that the molybdenum film is replaced with an IZO film. The structures corresponding to the steps of this procedure are also the same as the structures shown in FIGS. 30 to 35 using the molybdenum film as the interlayer, except that the molybdenum film is replaced with an IZO film. The following procedure will be described with reference to FIG. 38, focusing on the differences from the structure using the molybdenum film. Each structure corresponding to the steps of the procedure will be shown in the corresponding figure, but not described in detail. In the following description, the same reference numerals as those used in FIGS. 29 to 37 are used.

The procedure shown in FIG. 38 up to the step of forming openings in the planarizing layer (S71 to S78) is the same as Steps S34 to S42 shown in FIG. 6 of the procedure according to the first embodiment, and FIGS. 7 to 11 of the first embodiment correspond to those steps in the present embodiment, but the molybdenum film used in the first embodiment is replaced with an IZO film.

As shown in FIG. 38, first, an IZO film is formed (S71). In this step, the IZO film is formed over the entire surface of the lower glass plate 50, and continuously follows Step S32 shown in FIG. 5 in practice. More specifically, the IZO film is formed thin subsequent to the formation of the titanium/aluminum/titanium multilayer structure by sputtering. The resulting IZO/titanium/aluminum/titanium multilayer structure has a thickness of about 500 to 900 nm in total. This four-layer structure may be formed with, for example, a continuous sheet-fed sputtering apparatus by depositing a titanium layer, an aluminum layer, another titanium layer, and an IZO layer in that order subsequent to Step S30. These four layers may of course be formed with different dedicated apparatuses.

Preferably, the introduction of oxygen is minimized for forming the IZO film. Thus, the uppermost titanium layer of the connection wire layer can be prevented as much as possible from being oxidized during the formation of the IZO film. The structure corresponding to Step S71 is shown in FIG. 8 and in which the molybdenum film 72 is replaced with an IZO film, indicating that the IZO layer is disposed over the entire surface of the connection wire layer 70.

Then, IZO/titanium/aluminum/titanium multilayer wires are formed by photolithography and dry etching (S73). The dry etching can be performed using, for example, a chlorine-based etching gas. Alternatively, the IZO film may be patterned by wet etching and then the titanium/aluminum/titanium multilayer structure may be patterned with a chlorine-based dry etching gas. For the wet etching of the IZO film, an appropriate etchant containing phosphoric acid and nitric acid may be used. Such an etchant may be a so-called PAN solution, which is a mixed solution containing phosphoric acid, nitric acid, and acetic acid.

Figure 31:
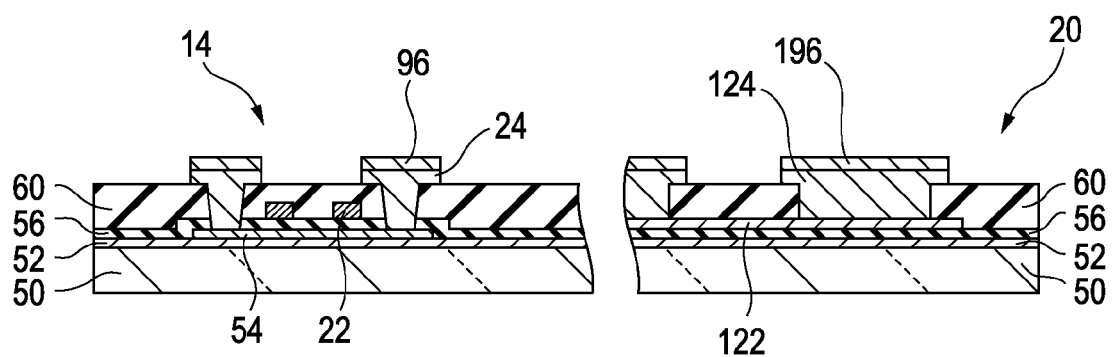
FIG. 31 is a sectional view of Step S72 of the flow chart shown in FIG. 28.

The structure corresponding to Step S73 is shown in FIG. 31 and in which the pixel molybdenum film 96, the terminal molybdenum film 196 are replaced with a pixel IZO film and a terminal IZO film, respectively. More specifically, a multilayer wire portion is formed with the pixel connection wire 24 and the pixel IZO film in the pixel section 14. The multilayer wire portion corresponds to the drain electrode of the switching element 26. In the terminal section 20 as well, a multilayer wire portion is formed with the terminal connection wire 124 and the terminal IZO film 196. Although the terminal IZO film in this step has the same shape as the terminal connection wire 124 as described with reference to Step S73, an opening is formed in the terminal IZO film in Step 81 ultimately.

Then, a $Si_xN_y$ protective insulating layer 62 is formed over the entire surface of the lower glass plate 50 (S74). The IZO film is not crystallized by heat for forming the protective insulating layer, for example, by heat for CVD; hence, the IZO film can easily be removed by wet etching performed below. Subsequently, a planarizing layer 64 is formed of a photosensitive acrylic resin over the entire surface of the lower glass plate 50. The planarizing layer 64 is patterned by photolithography so as to form a contact hole for the pixel electrode in the planarizing layer 64 and remove the planarizing layer 64 from the terminal section and around it (S76). Further, openings are formed by photolithography in desired regions of the protective insulating layer 62 exposed by forming the contact hole in the planarizing layer 64 or by removing the protective insulating layer (S78). These steps are performed in the same manner as those shown in FIG. 28.

Figure 32:
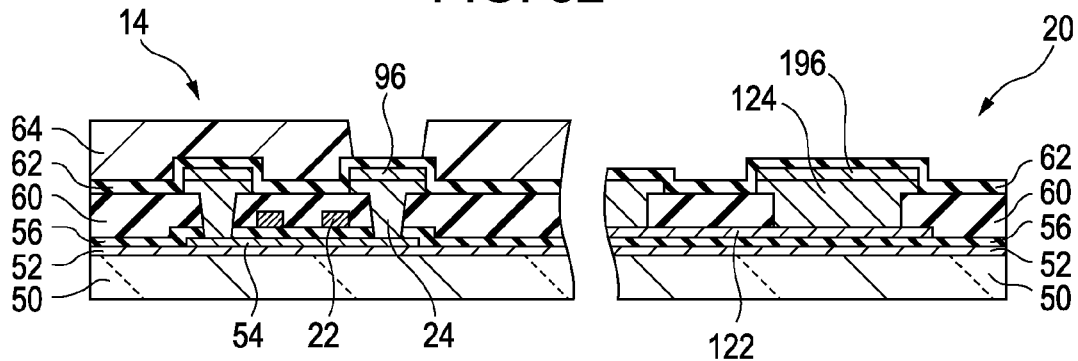
FIG. 32 is a sectional view of a state in the course of Step S78 of the flow chart shown in FIG. 28.

The formation of the openings is performed in the same manner as the step shown in FIG. 28. More specifically, the planarizing layer 64 is first patterned by photolithography. In the pixel section 14, the planarizing layer 64 overlying the multilayer wire portion corresponding to the drain electrode defined by the pixel connection wire 24 and the pixel IZO film is removed. Also, the portion of the planarizing layer 64 outside the end of the data line 25 of the pixel section 14 is removed; hence, the planarizing layer 64 disposed in the terminal section 20 is completely removed to expose the protective insulating layer 62. FIG. 32 shows the structure corresponding to the state in this step.

Subsequently, the protective insulating layer 62 is patterned. In the pixel section 14, the portion of the protective insulating layer 62 exposed by removing the planarizing layer 64 is removed. In the terminal section 20, the portion of the protective insulating layer 62 overlying the multilayer wire portion defined by the terminal connection wire 124 and the terminal IZO film, corresponding to the connection point to which the COG or OLB technique is applied is removed. The patterning of the protective insulating layer 62 is also performed in the same manner by dry etching using an etching gas such as $SF_6$ or $CF_4+O_2$, or by wet etching using buffered hydrofluoric acid (BHF). Since the uppermost titanium layer of the connection wire is covered with the IZO film in the region where openings are to be formed in the protective insulating layer 62 by patterning, the titanium layer is not affected by a product produced by patterning the protective insulating layer 62.

The openings are thus formed in desired regions. FIG. 33 shows a structure corresponding to the state in which desired openings are formed in the protective insulating layer 62 with the planarizing layer 64 removed from the terminal section 20. The resist used for forming the openings is removed by ashing and wet separation.

Then, the IZO film is removed from the terminal section 20 (S81). This step is performed using the protective insulating layer 62 as a mask. More specifically, an opening having substantially the same area as the opening formed in the protective insulating layer 62 in Step S78 is formed in the terminal IZO film. After Step S81, the terminal IZO film 197 thus has an opening. Hence, the terminal IZO film 197 remains only under the protective insulating layer 62 with the same opening as the opening in the protective insulating layer 62. This opening acts as a contact hole and the uppermost titanium layer 194 of the terminal connection wire 124 is exposed through the contact hole, as shown in FIG. 34. The portion of the terminal section 20 thus patterned correspond to the connection point to which the COG or OLB technique is applied.

The IZO film is removed only from the terminal section 20. The pixel IZO film in the pixel section 14 is left as it is. The removal, or patterning, of the IZO film can be performed by wet etching using, for example, an appropriate etchant containing phosphoric acid and nitric acid. Such an etchant may be a so-called PAN solution, which is a mixed solution containing phosphoric acid, nitric acid, and acetic acid. Since titanium is not dissolved in or damaged by the PAN solution, the uppermost titanium layer of the connection wire layer is prevented from being affected by the wet etching for removing the IZO film.

Then, a transparent electroconductive layer is formed of, for example, ITO (S82). The transparent electroconductive layer is patterned into transparent electroconductive films having predetermined shapes by photolithography using, for example, an oxalic acid-based etchant.

The pixel transparent electroconductive film 28 in the pixel section 14 is used as the pixel electrode. More specifically, the pixel transparent electroconductive film 28 is connected to the multilayer wire portion corresponding to the drain electrode defined by the pixel connection wire 24 and the pixel IZO film, and spreads over the pixel region overlying the planarizing layer 64. In the terminal section 20, the terminal transparent electroconductive film 128 is used as the connection point to which the COG or OLB technique is applied. More specifically, the terminal transparent electroconductive film 128 is disposed on the terminal connection wire 124 connected to the lower wire 122. The terminal IZO film having the opening is substantially not connected to the terminal transparent electroconductive film 128, as shown in FIG. 35.

Thus, in the lower substrate 12 of the liquid crystal display device of the present embodiment, the pixel section 14 and the terminal section 20 are formed using an IZO/titanium/aluminum/titanium multilayer structure as an electroconductive wire layer. In this instance, the IZO film in the terminal section 20 is removed corresponding to the opening formed in the protective insulating layer 62 after the formation of the IZO/titanium/aluminum/titanium multilayer structure.

Figure 39A:
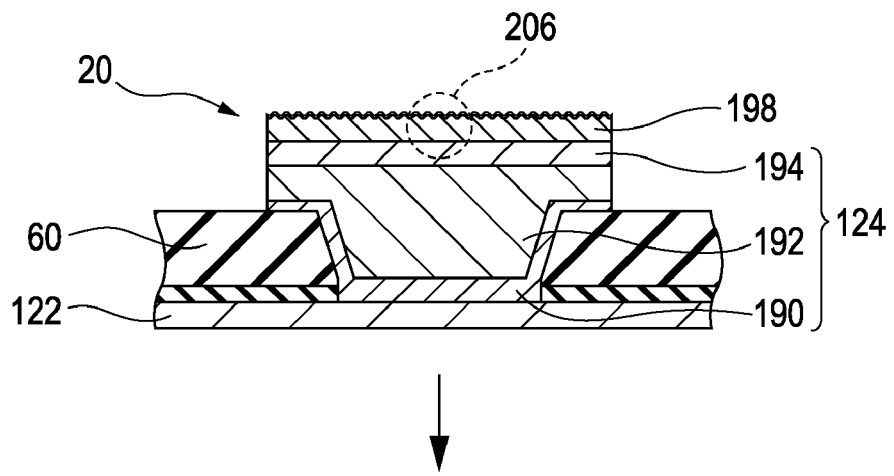
FIGS. 39A to 39C are representations of the effect of an IZO film formed in the sixth embodiment.
Figure 39B:
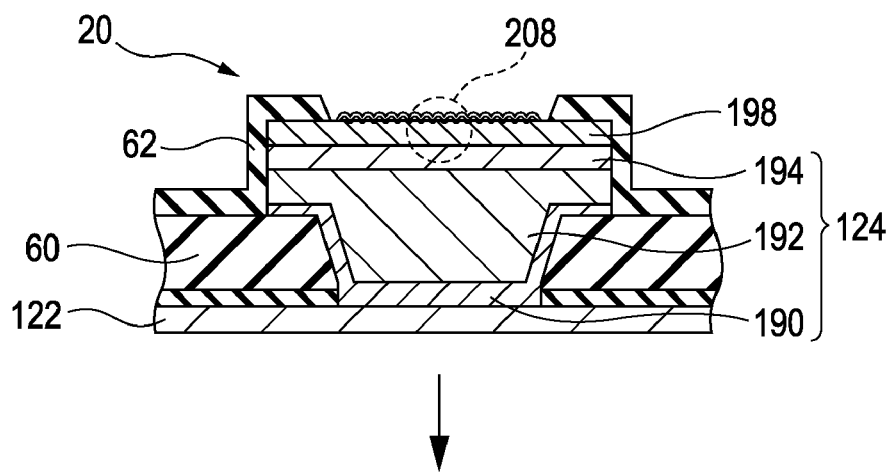
Figure 39C:
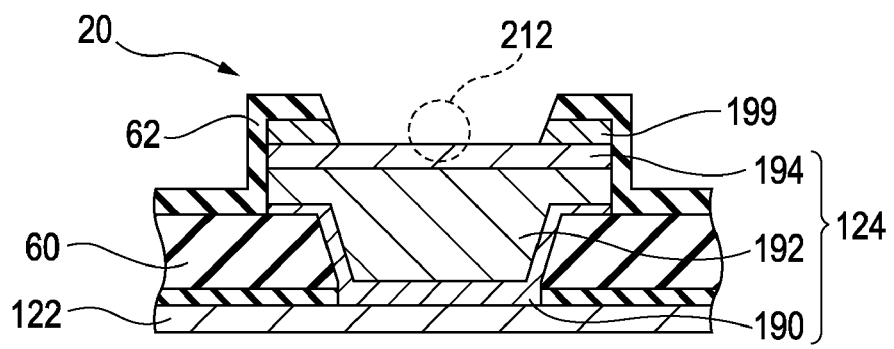

FIGS. 39A to 39C show states of the terminal section 20 in steps of the procedure of the flow chart shown in FIG. 38 and correspond to FIGS. 37A to 37C, respectively. FIG. 39A corresponds to Step S73 shown in FIG. 38 and the structure shown in FIG. 31; FIG. 39B corresponds to Step S78 shown in FIG. 38 and the structure shown in FIG. 33; and FIG. 39C corresponds to Step S81 shown in FIG. 38 and the structure shown in FIG. 34. In the following description, the same reference numerals as those used in FIGS. 29 to 37 are used, and the IZO film is designated by a new reference numeral.

As described in Step S73, a multilayer wire layer defined by an IZO/titanium/aluminum/titanium multilayer structure is formed, and is patterned into the terminal connection wires 124 and the terminal IZO films 198 by photolithography and dry etching, as shown in FIG. 37A. For the patterning by dry etching, a chlorine-based etching gas can be used, as described above. In this step, an oxide coating or the like is formed on the surface of the IZO film 198. Reference numeral 206 shown in FIG. 39A designates the interface with the oxide coating.

Then, a protective insulating layer 62 is formed. The IZO film is not crystallized by heat for forming the protective insulating layer, as described above. An opening is formed in the protective insulating layer 62 corresponding to the terminal IZO film 198 and the terminal connection wire 124. For forming the opening in the protective insulating layer 62, dry etching using an etching gas, such as $SF_6$ or $CF_4+O_2$, can be applied as in Step S78 shown in FIG. 38. FIG. 39B shows the state after this step.

In this step, the reaction of the $Si_xN_y$ of the protective insulating layer 62 with the etching gas produces a product on the surface of the uppermost layer, or the terminal IZO film 198. Although the detailed composition of the surface product is not clearly known, the surface product is a coating containing an F component and having a thickness of, for example, about 10 to 30 nm, as described with reference to FIG. 36B. Reference numeral 208 shown in FIG. 39B designates the interface with the surface product in addition to the oxide coating shown in FIG. 39A.

Then, the IZO film is removed from the terminal section 20, as described in Step S81 shown in FIG. 38. The removal, or patterning, of the IZO film can be performed by wet etching using, for example, a PAN solution, as described above. Titanium is not damaged by the PAN solution, as described above. The protective insulating layer 62 may be used as a mask for removing the molybdenum film. More specifically, the portion of the IZO film exposed through the opening formed in the protective insulating layer 62 is removed, and the surface product on the IZO film is also removed together with the IZO film. Thus, the uppermost titanium layer 194 of the terminal connection wire 124 is exposed, as shown in FIG. 39C. Reference numeral 212 shown in FIG. 39C designates the surface of the uppermost titanium layer 194 exposed by removing the IZO film and the surface product together. Subsequently, a terminal transparent electroconductive film 128 is formed on the exposed surface.

The procedure of the flow chart shown in FIG. 38 takes advantage that IZO is not crystallized by heat for forming a $Si_xN_y$ layer and, consequently, can be removed by wet etching, which does not damage the titanium layer. Thus, the surface product produced by dry-etching the protective insulating layer 62 can be removed. Consequently, only a very small amount of surface product remains between the terminal transparent electroconductive film 128 and the terminal connection wire 124. Thus, the increase of the interface resistance between the terminal transparent electroconductive film 128 and the terminal connection wire 124 can be prevented and easy connection can be achieved through the terminals, in comparison with the known process.

What is claimed is:

1. An electro-optic device comprising:
   a pixel section; and
   a terminal section around the pixel section, through which a semiconductor circuit or a wiring board is mounted, the terminal section including
   a lower wire formed on a substrate,
   a terminal section multilayer structure formed on the lower wire, the terminal section multilayer structure including a terminal connection wire including an uppermost layer containing titanium,
   a terminal interlayer formed on the terminal section multilayer structure and made of an electroconductive material capable of being wet-etched, and
   a terminal transparent electroconductive film formed on the terminal interlayer.

2. The electro-optic device according to claim 1, wherein the pixel section includes a semiconductor layer formed on the substrate and a pixel section multilayer structure formed on the semiconductor layer, the pixel section multilayer structure including a pixel connection wire formed in the same process as the terminal connection wire is formed, a pixel interlayer formed in the same process as the terminal interlayer is formed, and a pixel transparent electroconductive film formed in the same process as the terminal transparent electroconductive film is formed, in that order from below.

3. The electro-optic device according to claim 2, wherein the pixel interlayer is made of molybdenum.

4. The electro-optic device according to claim 2, wherein the pixel interlayer is made of IZO or ITO.

5. The electro-optic device according to claim 2, further comprising an insulating interlayer formed on the semiconductor layer,
wherein the pixel section multilayer structure further comprises a lowermost layer of titanium formed on the semiconductor layer, and a middle aluminum layer formed on portions of the semiconductor layer and the insulating interlayer.

6. The electro-optic device according to claim 1, wherein the terminal interlayer is made of molybdenum.

7. The electro-optic device according to claim 1, wherein the terminal interlayer is made of IZO or ITO.

8. The electro-optic device according to claim 1, further comprising an insulating interlayer formed on the lower wire,
wherein the terminal section multilayer structure further comprises a lowermost layer of titanium formed on the lower wire, and a middle aluminum layer formed on portions of the lower wire and the insulating interlayer.

9. An electro-optic device comprising:
a pixel section; and
a terminal section around the pixel section through which a semiconductor circuit or a wiring board is mounted, the terminal section including
a lower wire formed on a substrate,
a terminal section multilayer structure formed on the lower wire, the terminal section multilayer structure including a terminal connection wire including an uppermost layer containing titanium,
a terminal protective insulating layer having an opening through which the terminal connection wire is exposed, and
a terminal interlayer covering the terminal connection wire exposed through the opening, the terminal interlayer being made of an electroconductive material capable of being wet-etched, and a terminal transparent electroconductive film, in that order from below.

10. The electro-optic device according to claim 9, wherein the pixel section includes a semiconductor layer formed on the substrate and a pixel section multilayer structure formed on the semiconductor layer, the pixel section multilayer structure including, in this order from below, a pixel connection wire formed in the same process as the terminal connection wire is formed, a pixel protective insulating layer having an opening through which the pixel connection wire is exposed, the pixel protective insulating layer being formed in the same process as the terminal protective insulating layer is formed, and a pixel transparent electroconductive film covering the pixel connection wire exposed through the opening, the pixel transparent electroconductive film being formed of the same process as the terminal transparent electroconductive film is formed.

11. The electro-optic device according to claim 9, wherein the terminal interlayer is made of molybdenum.

12. The electro-optic device according to claim 9, wherein the terminal interlayer is made of IZO or ITO.

13. An electro-optic device comprising
a pixel section including
a semiconductor layer formed on a substrate,
a pixel section multilayer structure formed on the semiconductor layer, the pixel section multilayer structure including a pixel connection wire including an uppermost layer containing titanium,
a pixel interlayer formed on the pixel section multilayer structure made of an electroconductive material capable of being wet-etched, and
a pixel transparent electroconductive film formed on the pixel interlayer; and
a terminal section around the pixel section, through which a semiconductor circuit or a wiring board is mounted, the terminal section including
a lower wire formed on the substrate,
a terminal section multilayer structure formed on the lower wire, the terminal section multilayer structure including a terminal connection wire including an uppermost layer containing titanium,
a terminal interlayer formed on the terminal section multilayer structure and made of an electroconductive material capable of being wet-etched, and
a terminal transparent electroconductive film formed on the terminal interlayer.

14. The electro-optic device according to claim 13, wherein the pixel section further includes a pixel protective insulating layer between the pixel interlayer and the pixel transparent electroconductive film, wherein the terminal interlayer is formed in the same process in which the pixel interlayer is formed, a terminal protective insulating layer formed in the same process as the pixel protective insulating layer is formed, and the terminal transparent electroconductive film is formed in the same process in which the pixel transparent electroconductive film is formed, in that order from below, and wherein the terminal protective insulating layer and the terminal interlayer have an opening and the terminal transparent electroconductive film fills the opening.

15. The electro optic device according to claim 14, wherein the pixel interlayer is made of molybdenum.

16. The electro optic device according to claim 14, wherein the pixel interlayer is made of IZO or ITO.

17. The electro-optic device according to claim 13, wherein the terminal interlayer is made of molybdenum.

18. The electro optic device according to claim 13, wherein the terminal interlayer is made of IZO or ITO.

* * * * *